US 12,494,705 B2

(12) United States Patent
Mauger et al.

(10) Patent No.: US 12,494,705 B2
(45) Date of Patent: Dec. 9, 2025

(54) SYSTEMS AND METHODS FOR CONTROLLING SOFT-SWITCHING CURRENT SOURCE CONVERTERS

(71) Applicant: Georgia Tech Research Corporation, Atlanta, GA (US)

(72) Inventors: Mickael J. Mauger, Atlanta, GA (US); Rajendra Prasad Kandula, Atlanta, GA (US); Deepak M. Divan, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 261 days.

(21) Appl. No.: 18/021,263

(22) PCT Filed: Aug. 20, 2021

(86) PCT No.: PCT/US2021/046919
§ 371 (c)(1),
(2) Date: Feb. 14, 2023

(87) PCT Pub. No.: WO2022/040537
PCT Pub. Date: Feb. 24, 2022

(65) Prior Publication Data
US 2024/0039388 A1 Feb. 1, 2024

Related U.S. Application Data

(60) Provisional application No. 63/068,280, filed on Aug. 20, 2020.

(51) Int. Cl.
*H02M 5/293* (2006.01)
*H02M 1/00* (2006.01)
(52) U.S. Cl.
CPC ........ *H02M 1/0058* (2021.05); *H02M 5/2932* (2021.05)

(58) Field of Classification Search
CPC .. H02M 5/2932; H02M 1/0058; H02M 5/225; H02M 5/25; H02M 7/4815;
(Continued)

(56) References Cited

U.S. PATENT DOCUMENTS 5,121,033 A 6/1992 Kosich
5,267,133 A 11/1993 Motomura et al.
(Continued)

FOREIGN PATENT DOCUMENTS

EP 3629462 A1 4/2020
JP H4210775 A 7/1992
JP H746839 A 2/1995

OTHER PUBLICATIONS

Extended European Search Report pursuant to Rule 62 EPC in related European Patent Application No. 21859207.9, dated Sep. 5, 2024 (13 pages).
(Continued)

*Primary Examiner* — Alex Torres-Rivera
(74) *Attorney, Agent, or Firm* — TROUTMAN PEPPER LOCKE LLP; Ryan A. Schneider; Nicholas H. Doss

(57) ABSTRACT

An exemplary embodiment of the present disclosure provides a resonant module and sensing circuits for use with a soft-switching current source converter. The resonant module comprises a resonant switch, a resonant inductor, and a resonant capacitor. The resonant inductor is connected in electrical series with the resonant switch. The resonant capacitor is connected in parallel with the serially connected resonant switch and resonant capacitor. The resonant module further comprises first and second sensing circuits. The first sensing circuit is configured to generate a first sensing signal indicative of when the time derivative of a voltage across the resonant capacitor is negative. The second sensing circuit is configured to generate a second sensing signal
(Continued)

indicative of when a voltage across the resonant capacitor is less than or equal to a predetermined threshold value.

37 Claims, 18 Drawing Sheets

(58) Field of Classification Search
CPC .... H02M 5/253; H02M 5/257; H02M 5/2573; H02M 5/27; H02M 5/271; H02M 5/272; H02M 5/275; H02M 5/293; H02M 5/297
See application file for complete search history.

(56) References Cited

U.S. PATENT DOCUMENTS

| | | | |
|---|---|---|---|
| 5,280,421 A | | 1/1994 | De Doncker et al. |
| 9,919,610 B1* | | 3/2018 | Sarwat .................... B60L 53/12 |
| 2008/0298094 A1* | | 12/2008 | Cuadra ............. H02M 3/33561 |
| | | | 363/21.12 |
| 2013/0016533 A1 | | 1/2013 | Halberstadt |
| 2015/0256074 A1 | | 9/2015 | Biondi et al. |
| 2019/0280586 A1 | | 9/2019 | Chen et al. |
| 2019/0288563 A1 | | 9/2019 | Yates et al. |

OTHER PUBLICATIONS

Chen, Hao and Deepak Divan. "Soft-Switching Solid-State Transformer (S4T)." IEEE Transactions on Power Electronics 33 (2018): 2933-2947 (15 pages).

International Search Report and Written Opinion from Application No. PCT/US2021/46919 dated Nov. 23, 2021.

Notification of Reasons for Refusal received in related Korean Patent Application No. 10-2023-7008881, mailed Jul. 15, 2025 (with machine translation) (6 pages).

Notice of Reasons for Refusal received in related Japanese Patent Application No. 2023-512142, mailed Oct. 28, 2025 (with machine translation) (10 pages).

* cited by examiner

SYSTEMS AND METHODS FOR CONTROLLING SOFT-SWITCHING CURRENT SOURCE CONVERTERS

CROSS-REFERENCE TO RELATED APPLICATIONS

This application claims the benefit of U.S. Provisional Application Ser. No. 63/068,280, filed on 20 Aug. 2020, which is incorporated herein by reference in its entirety as if fully set forth below.

FIELD OF THE DISCLOSURE

The various embodiments of the present disclosure relate generally to resonant modules and sensing circuits for soft-switching current source converters and to methods of controlling the resonant tank of said converters.

BACKGROUND

Soft-switching converters, with and without high-frequency isolation, have been a promising alternative to standard hard-switching power electronics for many years. Their applications range from consumer electronics to high-power conversion and bulk power systems. Such converters typically interface direct current (DC), single-phase, or multi-phase alternating current (AC) sources and loads, and perform the energy conversion with a higher switching frequency and/or higher efficiency than their conventional hard-switched counterparts. Despite these attractive features, the adoption of resonant converters has been limited thus far by topological complexities, control overhead, and limited range of soft-switching operation.

Two novel soft-switching converters, the Soft-switching Solid State Transformer (S4T), which is disclosed in U.S. Pat. No. 10,491,098 and PCT Publication No. WO2020/023471, which are incorporated by reference in their entireties as if fully set forth below, and the Soft-Switching Current Source Inverters (SSCSI), which is disclosed in PCT Publication No. WO2021/041465], which is incorporated by reference in its entirety as if fully set forth below, are promising to change this paradigm and bring the benefits of soft-switching to a wide range of applications without added complexity in the control and the power conversion stage. The two converter families are resonant transition converters where standard pulse-width modulation control and techniques are applicable to drive the main power devices, and the soft-switching operation is realized through unique resonant transition states inserted during the converters' switching state commutations. Although fundamentally different in their principle of operation and control, both the S4T, shown in FIG. 1 in a three-phase to three-phase configuration with high-frequency isolation, and the SSCSI, shown in FIG. 2 in an electric vehicle drivetrain configuration, rely on a minimalist resonant tank circuit to achieve the resonant transitions and to enable the zero-voltage switching (ZVS) operation for all main power devices. This resonant circuit, made of a resonant inductor $L_r$, a resonant capacitor $C_r$, and a reverse-blocking auxiliary resonant switch $S_r$, essentially decouples the resonant transitions and resonance phase from the state of the converter DC-link and provides an additional degree of freedom in the control of the resonance sequence. Through appropriate gating of the auxiliary switch, it is possible to ensure the soft-switching operation regardless of the converters loading level and for the entire voltage, current and power range of the inputs/outputs.

However, because of the very fast dynamic of the resonant tank, the accurate and precise control of this auxiliary switch and the proper timing of the resonance sequence have proven difficult and costly with the available sensed quantities, traditional sensor technologies, and existing control approaches. Open loop or semi closed-loop forms have been used thus far, where the required gating and timing information are either fixed, or estimated from the converter operating state at the expense of complex and often non-real time computations. This results in unacceptable device voltage stress during converter transients or faults, and can disturb the soft-switching operation under normal operating conditions, particularly for applications where wide variation of source and load voltages are expected, such as in motor drive applications, or for multi-port converters interfacing a large number of sources and loads operating at different voltage and frequency.

Accordingly, there is a need for improved systems and methods for extracting critical timing information, and controlling, the resonant tank of a soft-switching current source converter that address the problems discussed above.

BRIEF SUMMARY

The present disclosure relates to resonant modules and sensing circuits for use with soft-switching current source converters and methods of controlling one or more resonant switches and one or more bridge switches of a soft-switching current source converters. An exemplary embodiment of the present disclosure provides a resonant module for use with a soft-switching current source converter. The resonant module can comprise a resonant switch, a resonant inductor, and a resonant capacitor. The resonant inductor can be connected in electrical series with the resonant switch. The resonant capacitor can be connected in parallel with the serially connected resonant switch and resonant capacitor. The resonant module can further comprise a first sensing circuit configured to generate a first sensing signal indicative of when the time derivative of a voltage across the resonant capacitor is negative. The resonant module can further comprise a second sensing circuit configured to generate a second sensing signal indicative of when a voltage across the resonant capacitor is less than or equal to a predetermined threshold value.

In any of the embodiments disclosed herein, the resonant module can be configured to transmit the first sensing signal to a controller of the soft-switching current source converter.

In any of the embodiments disclosed herein, the resonant module can be configured to transmit the second sensing signal to a controller of the soft-switching current source converter.

In any of the embodiments disclosed herein, the resonant module can further comprise control logic circuitry configured to control the resonant switch.

In any of the embodiments disclosed herein, the control logic circuitry can be configured to receive the first and second sensing signals and control the resonant switch, based at least in part, on the first and second sensing signals.

In any of the embodiments disclosed herein, the control logic circuitry can be configured to turn on the resonant switch when the second sensing signal indicates that the voltage across the resonant capacitor is less than or equal to the predetermined threshold value to initiate a resonance between the resonant inductor and the resonant capacitor.

In any of the embodiments disclosed herein, the control logic circuitry can be further configured to receive and send sensing signals between one or more other resonant modules of the soft-switching current source converter.

In any of the embodiments disclosed herein, the predetermined threshold value can be a variable value.

In any of the embodiments disclosed herein, at least one of the control logic circuitry and a controller of the soft-switching current source converter can be configured to alter the predetermined threshold based, at least in part, on the first sensing signal.

In any of the embodiments disclosed herein, the at least one of the control logic circuitry or a controller of the soft-switching current source converter can be configured to increase the predetermined threshold if the first sensing signal indicates the time derivative of the voltage across the resonant capacitor is negative during a zero voltage switching transition state after a resonance phase of a switching cycle of the soft-switching current source converter for a period of time greater than a predetermined time period. As used herein, the resonance phase is the phase of the resonance sequence during which the first sensing circuit does not indicate that the time derivative of the voltage across the resonant capacitor is negative. As used herein, increasing the predetermined threshold means making the predetermined threshold more positive (i.e., making its voltage value greater than its previous value).

In any of the embodiments disclosed herein, the at least one of the control logic circuitry or a controller of the soft-switching current source converter is configured to decrease the predetermined threshold if the first sensing signal indicates the time derivative of the voltage across the resonant capacitor is negative during a zero voltage switching transition state after a resonance phase of a switching cycle of the current converter for a period of time less than the predetermined time period. As used herein, decreasing the predetermined threshold means making the predetermined threshold more negative (i.e., making its voltage value less than its previous value).

In any of the embodiments disclosed herein, a controller of the soft-switching current source converter can be configured to turn on at least one bridge switch to transition into a next active switching state if the first sensing signal indicates that the time derivative of the voltage across the resonant capacitor is negative after a resonance phase of a switching cycle of the soft-switching current source converter.

In any of the embodiments disclosed herein, the predetermined threshold can be a fixed value.

In any of the embodiments disclosed herein, the first sensing circuit can be connected in parallel with the resonant capacitor.

In any of the embodiments disclosed herein, the first sensing circuit can comprise sensing resistor connected in series with an optocoupler.

In any of the embodiments disclosed herein, the serially connected sensing resistor and optocoupler can be connected in anti-parallel with a Zener diode.

In any of the embodiments disclosed herein, the serially connected sensing resistor and optocoupler can be further connected in parallel with a bias resistor.

In any of the embodiments disclosed herein, the optocoupler can be configured to generate the first sensing signal.

In any of the embodiments disclosed herein, the resonant module can further comprise a communication link configured to interface with a controller of the soft-switching current source converter.

In any of the embodiments disclosed herein, the second sensing circuit can be connected in parallel with the resonant capacitor.

In any of the embodiments disclosed herein, the second sensing circuit can comprise a reference capacitor, a series optocoupler sensing circuit, a series sensing resistor, and a series diode.

In any of the embodiments disclosed herein, the second sensing circuit can further comprise a discharge circuit connected in parallel with the reference capacitor.

In any of the embodiments disclosed herein, the discharge circuit can further comprise a serially connected controllable switch and discharge resistor.

In any of the embodiments disclosed herein, the resonant module can further comprise an isolated DC/DC converter configured to isolate and power the discharge circuit.

In any of the embodiments disclosed herein, the resonant module can further comprise a control logic comprising a comparator circuit, a digital isolator, and a frequency-to-voltage conversion circuit, to control a controllable switch of the discharge circuit and control the predetermined threshold value.

In any of the embodiments disclosed herein, the second sensing circuit can comprise a Zener diode providing a voltage reference, an optocoupler sensing circuit, a series sensing resistor, a series diode, and a capacitive voltage divider.

In any of the embodiments disclosed herein, the second sensing circuit can comprise a series connection of at least two Zener diodes in opposite orientation, a series sensing resistor, a series optocoupler sensing circuit, a capacitive voltage divider, and a resistive voltage divider.

In any of the embodiments disclosed herein, the soft-switching current source converter can comprise a DC-link. The resonant module can be electrically connected in parallel with the DC-link. The DC-link can be many different DC-links, including, but not limited to a series inductor, a shunt inductor, or a shunt transformer.

In any of the embodiments disclosed herein, the soft-switching current source converter can comprise a leakage management diode connected in series between the resonant module and the DC-link.

In any of the embodiments disclosed herein, the resonant module can further comprise a leakage management diode connected in series with the DC-link.

Another embodiment of the present disclosure provides a method of controlling a resonant tank of a soft-switching current source converter. The resonant tank can comprise a resonant switch, a resonant inductor connected in electrical series with the resonant switch, and a resonant capacitor connected in parallel with the serially connected resonant switch and resonant capacitor. The method can comprise: generating a first sensing signal indicative of when the time derivative of a voltage across the resonant capacitor is negative; and generating a second sensing signal indicative of when a voltage across the resonant capacitor is less than or equal to a predetermined threshold value.

In any of the embodiments disclosed herein, the method can further comprise transmitting the first sensing signal to a controller of the soft-switching current source converter.

In any of the embodiments disclosed herein, the method can further comprise transmitting the second sensing signal to a controller of the soft-switching current source converter.

In any of the embodiments disclosed herein, the method can further comprise: receiving, at a control logic circuitry, the first and second sensing signals; and controlling, with the control logic circuitry, the resonant switch, based at least in part, on the received first and second sensing signals.

In any of the embodiments disclosed herein, the method can further comprise turning on the resonant switch, with the control logic circuitry, to initiate a resonance between the resonant inductor and the resonant capacitor when the second sensing signal indicates that the voltage across the resonant capacitor is less than or equal to the predetermined threshold value.

In any of the embodiments disclosed herein, the predetermined threshold can be a variable value.

In any of the embodiments disclosed herein, the method can further comprise altering the predetermined threshold based, at least in part, on the received first sensing signal.

In any of the embodiments disclosed herein, altering the predetermined threshold can comprise increasing the predetermined threshold if the first sensing signal indicates the time derivative of the voltage across the resonant capacitor is negative during a zero voltage switching transition state after a resonance phase of a switching cycle of the soft-switching current source converter for a period of time greater than a predetermined time period.

In any of the embodiments disclosed herein, a soft-switching current source converter can comprise a plurality of resonant modules, each with first and second sensing circuits generating first and second sensing signals, respectively, and in the methods disclosed herein, the controller of the soft-switching current source converter can use the first and/or second sensing signals from one or more of the plurality of resonant modules to control various aspects of the soft-switching current source converter.

In any of the embodiments disclosed herein, altering the predetermined threshold can comprise decreasing the predetermined threshold if the first sensing signal indicates the time derivative of the voltage across the resonant capacitor is negative during a zero voltage switching transition state after a resonance phase of a switching cycle of the soft-switching current source converter for a period of time less than the predetermined time period.

In any of the embodiments disclosed herein, the control logic circuitry can comprise a resonant switch gate driver integrated circuit.

In any of the embodiments disclosed herein, the predetermined threshold can be a fixed value.

In any of the embodiments disclosed herein, the method can further comprise altering one or more characteristics of a switching cycle implemented by the soft-switching current source converter to increase an efficiency of the soft-switching current source converter based, at least in part, on the first sensing signal and/or the second sensing signal.

In any of the embodiments disclosed herein, altering the one or more characteristics of the switching cycle can comprise decreasing a time period of a ZVS transition state of the switching cycle.

In any of the embodiments disclosed herein, the method can further comprise measuring one or more timing characteristics of a switching cycle implemented by the soft-switching current source converter to improve accuracy of a modulation strategy, extend and improve linearity of the soft-switching current source converter, improve the quality of the waveforms generated by the soft-switching current source converter, and/or reduce the harmonic distortion, based, at least in part, on the first sensing signal and/or second sensing signal.

In any of the embodiments disclosed herein, measuring the one or more timing characteristics of the switching cycle can comprise measuring a time duration of a ZVS transition state of the switching cycle.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

FIG. 16A illustrates hard-switching turn ON of incoming vector (incomplete resonance sequence). FIG. 16B illustrates soft-switching turn ON of incoming vector (complete resonance sequence).

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Figure 3:
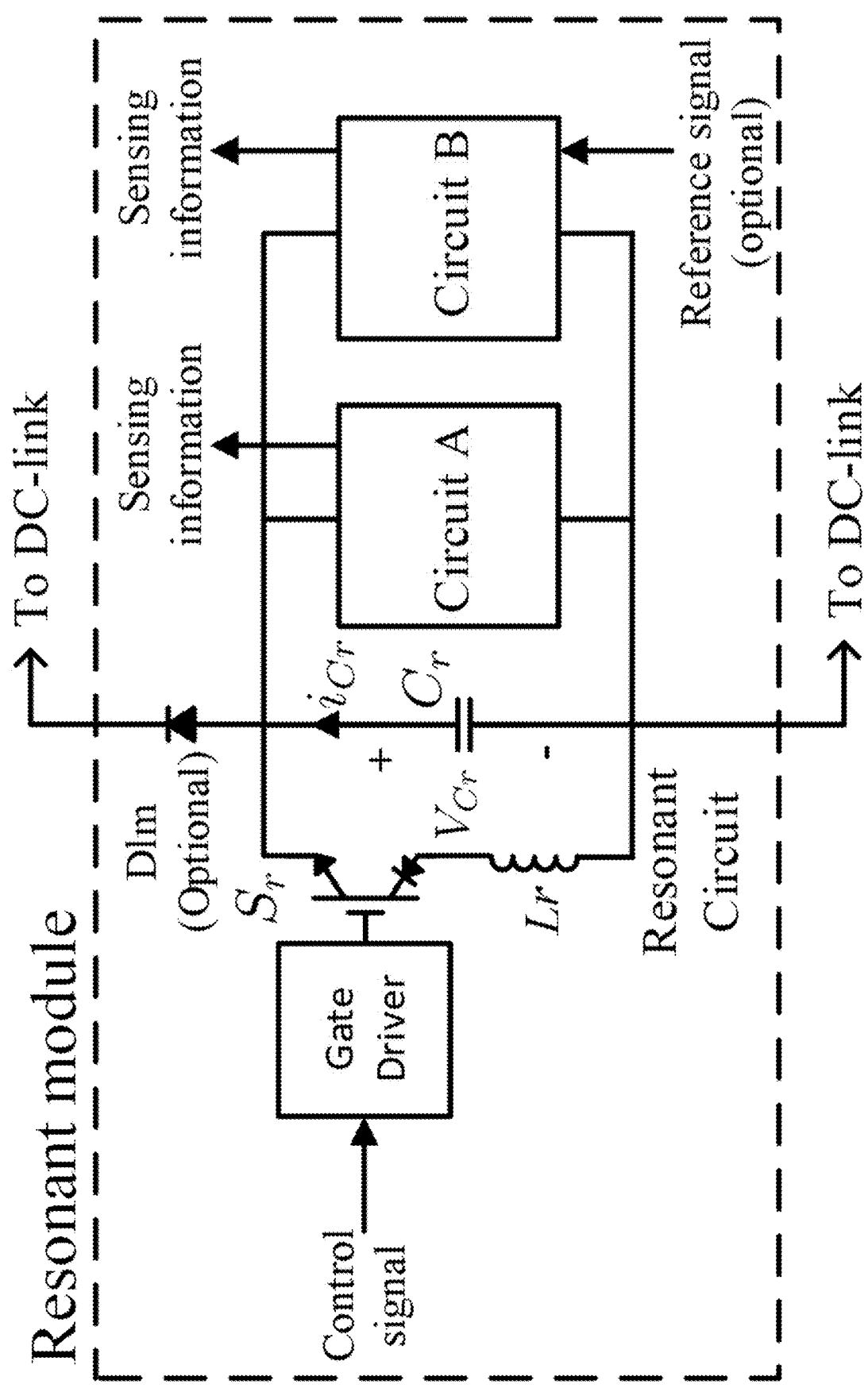
FIG. 3 provides a resonant module, in accordance with an exemplary embodiment of the present disclosure.

Disclosed herein is a compact, low-cost, and self-contained resonant module integrating a resonant tank circuit and two novel sensing circuits to enable, through unique control methods, a simple and reliable sub-switching cycle control of the auxiliary resonant switch of the resonant tank and of the resonance sequence timing in a soft-switching current source converter, including, but not limited to the previously introduced S4T and SSCSI converters. Within the resonant module, these two sensing circuits—a first sensing circuit (sometimes referred to herein as "Circuit A") and a second sensing circuit (sometimes referred to herein as "Circuit B") can interface directly with the resonant tank circuit, as shown in FIG. 3, and can monitor the state of the resonant circuit to provide the critical timing information used during the resonance sequences for a true closed-loop control of these periods. The sensing circuits can be specifically designed to sense the minimum amount of information needed for the unique sub-switching cycle control methods described herein, with low propagation delay and high-bandwidth to accurately track the fast dynamic of the resonant circuit. This can also be achieved at a fraction of the cost of existing sensing technology and with lower propagation delay than best-in-class sensors currently available today.

The resonant module, sensing circuits and techniques discussed below can provide a simple, cost-effective and robust solution to guarantying a safe and stable soft-switching operation of the soft-switching current source converter under both normal and transient conditions. The voltage stress levels can be controlled on a sub-switching cycle basis, including during large transients and converter faults, and the resonant tank losses can be minimized. Furthermore, the information from Circuit A can also be used to improve the converters waveform quality, particularly under light-load conditions. These sensing circuits and techniques can be agnostic to the higher-level modulation strategy used for the control of the converter at the multi-switching cycle level, and can apply to all variants of the S4T and SSCSI converters to form self-contained resonant modules, irrespective of the number of resonant tank circuits used in the operational implementation.

Figure 4:
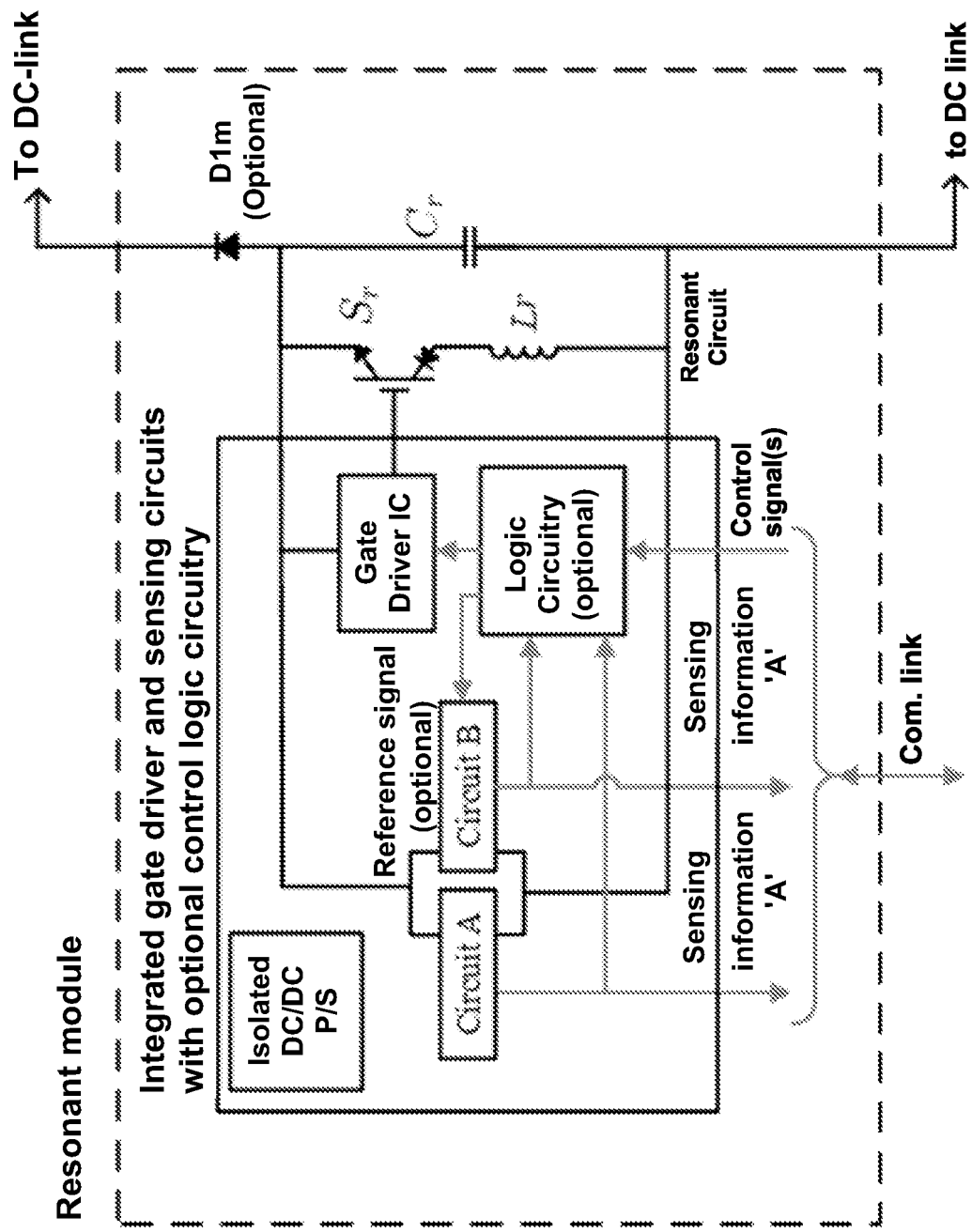
FIG. 4 provides a resonant module with integrated auxiliary switch gate driver and sensing circuits and optional control logic circuitry, in accordance with an exemplary embodiment of the present disclosure.

To further simplify the implementation and favor even greater integration, the proposed sensing circuits of the resonant module, and some level of logic circuitry realizing parts of the disclosed control methods, can be directly integrated with the gate driver of the resonant circuit's auxiliary switch (sometimes referred to herein as a "resonant switch"). In some embodiments, the resonant switch can be a reverse blocking switch. As used herein, the term "reverse blocking switch" refers to a switch or switch assembly that conducts current in one direction and blocks voltage in both directions. Integration with the gate driver of the resonant circuit's auxiliary switch can also allow for the sharing of some common circuitry functions between the circuits, such as the DC/DC power supply isolation. In addition, the optional control logic circuitry can make it possible to realize the fast-acting sub-switching cycle control methods discussed below directly at the auxiliary switch level for a semi-autonomous operation of the resonant module with the lowest control delay. An exemplary implementation of such an integrated resonant module configuration is shown in FIG. 4.

Figure 5:
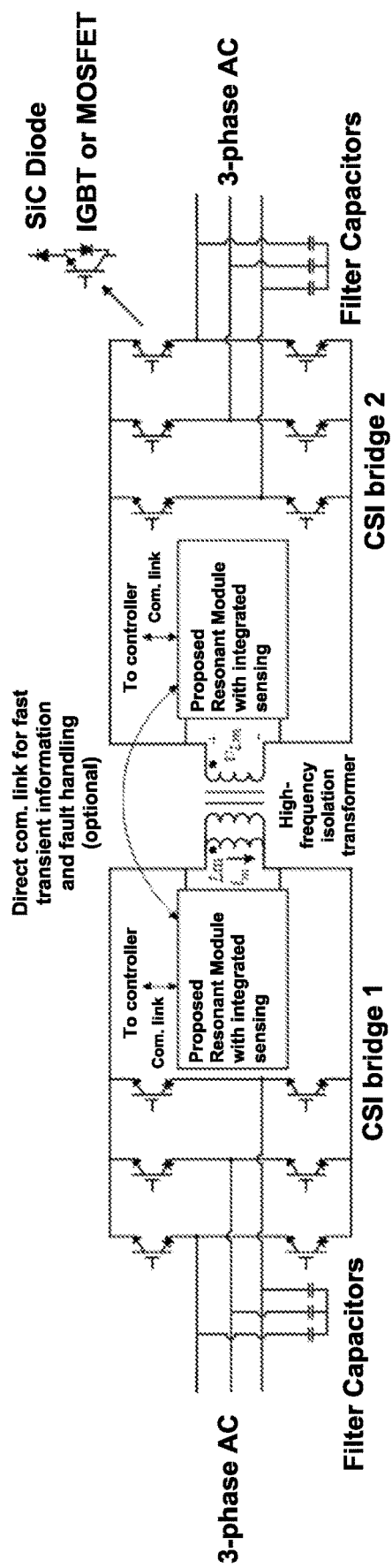
FIG. 5 provides an exemplary S4T implementation in a three-phase to three-phase AC/AC configuration with high-frequency isolation, using two resonant modules with integrated sensing, in accordance with an exemplary embodiment of the present disclosure.

Depending on the application and topological variant, a number of proposed resonant modules, consisting of a resonant tank circuit augmented with the sensing circuits as disclosed herein and optional control logic circuitry, are used in the converter. In some embodiments, the resonant module can interface with the converter's controller to send and receive the sensing information and control signal(s) to implement the proposed sub-switching cycle control methods. Additionally, an optional fast communication link between the resonant modules can be used to transfer fast transient information and coordinate the resonant modules operation, including under fault modes. This additional optional direct communication link between the resonant modules may not be required in applications where the converter's controller handles the inter-resonant module communications. An exemplary implementation of the S4T shown in FIG. 1 using a number of an exemplary resonant module is shown in FIG. 5. The proposed sensing circuits and associated control methods are described below.

Circuit A: Discharge Monitoring Circuit and Associated Control Methods

The first sensing circuit, also referred to herein as "Circuit A" and control methods using the first sensing signal generated by Circuit A will now be discussed.

Resonant Capacitor Discharge Monitoring in Soft-Switching Current Source Converters As discussed above, the first sensing circuit (Circuit A) can be configured to monitor the discharge of the resonant capacitor $C_r$ in the resonant tank circuit of the resonant module. In particular, the first sensing circuit can be configured to determine when the time derivative of a voltage (also referred to herein as a voltage rate of change) across the resonant capacitor $C_r$ is negative. The S4T and SSCSI are resonant transition converters where the ZVS turn-ON and turn-OFF of the power devices take place during the ZVS transition states throughout the switching cycle when the resonant capacitor of the resonant circuit(s) is being discharged. As used herein, resonant capacitor being discharged means that the current '$i_{C_r}$' exiting the resonant capacitor is positive when measured so that the current through the DC-link connected in parallel to the resonant capacitor is positive when circulating, at least in part through the resonant capacitor, as shown in FIG. 3. Resonant capacitor being discharged is sometimes referred to herein as "capacitor being pre-charged." As used herein and as shown in FIG. 3, a voltage across the resonant capacitor '$V_{cr}$' is measured so that the voltage is decreasing (sometimes referred to herein as "becoming more negative") when the current exiting the resonant capacitor is positive when measured as detailed herein, or when the capacitor is being discharged. Depending on the converter type (S4T or SSCSI) and implementation, one or multiple resonant circuits and modules can be used to enable the soft-switching operation, and the switching cycle structure can depend on the final application, yet the discharge monitoring can still be of universal significance for all S4T and SSCSI variants by identifying and precisely positioning the ZVS transition states throughout the switching cycle. Without loss of generality, the AC/AC three-phase S4T converter shown in FIG. 1 can be used as an example in the following. A corresponding typical switching cycle and waveforms of interest, with the ZVS transition states highlighted, are shown in FIG. 6.

Figure 6:
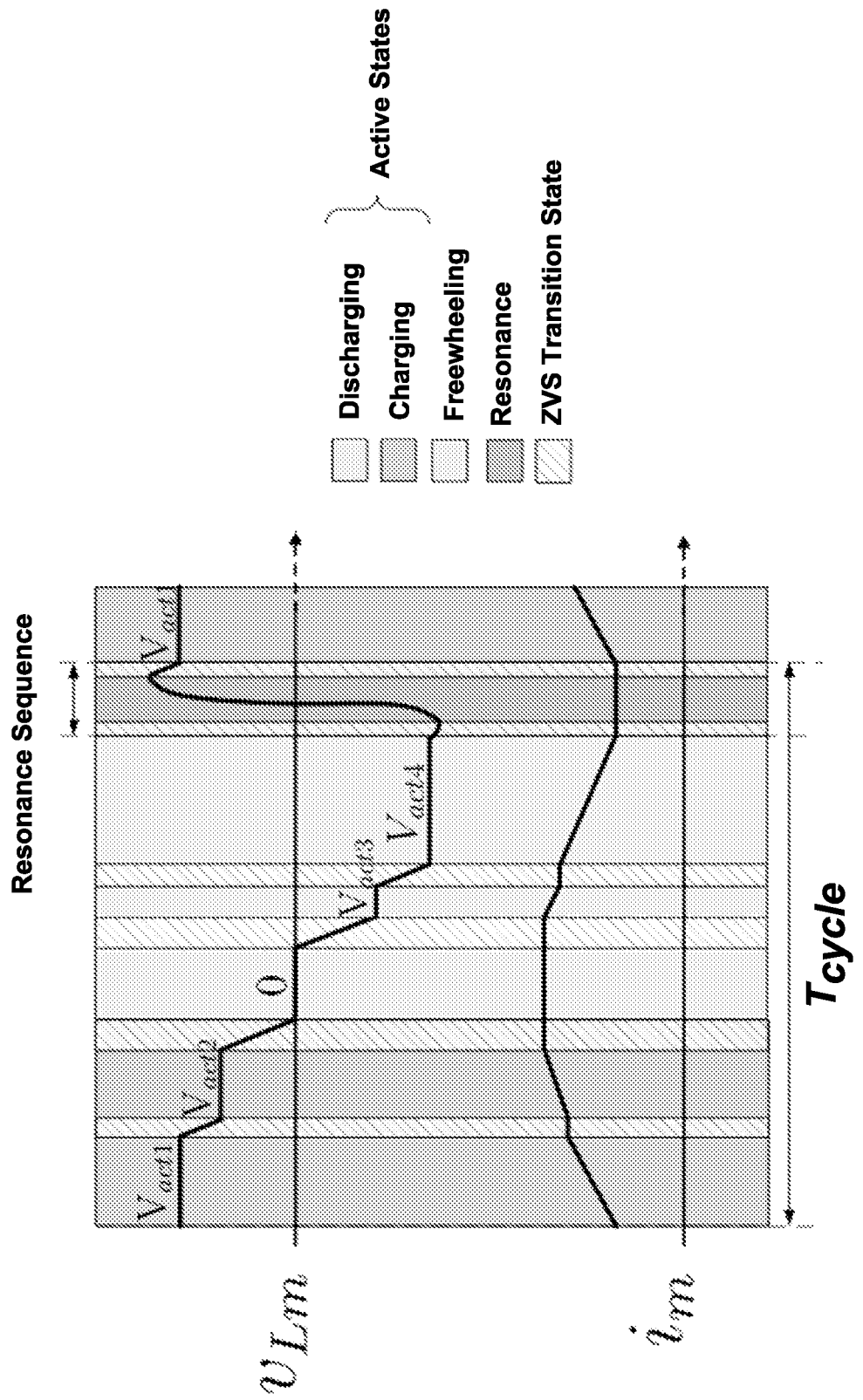
FIG. 6 illustrates a S4T switching cycle in a three-phase AC/AC configuration, showing DC-link voltage ($v_{Lm}$) and current ($i_m$) with main operating modes identified, in accordance with an exemplary embodiment of the present disclosure.

As shown in FIG. 6, the switching cycle comprises of a series of 'active states' applying various voltages across the DC-link, $V_{act1}$, $V_{act2}$, $V_{act3}$ and $V_{act4}$ in this case, and a 'freewheeling state', 0, bypassing the DC-link current with zero voltage. The states can be applied successively starting from the most positive voltage to the most negative voltage. A ZVS transition state can be inserted between any two adjacent states of decreasing voltage to enable the soft-switching operation of the converter, as shown in FIG. 6. When a transition to a more positive voltage level is needed, a resonance sequence can be used and inserted into the cycle.

Regardless of the higher-level modulation process used to determine the number, order and duration of the active states, the transition from an active state to the next one can happen during a ZVS transition state of unknown and variable duration, depending on the voltage levels before and after the transition, and the DC-link current level, amongst other factors. Similarly, independent of the number of resonance sequences used and of their positioning in the switching cycle, a full resonance sequence finishes with a ZVS transition phase to the next incoming voltage level. In addition, the complete resonance sequence duration is also unknown and variable, and can depend non-linearly on a number of factors including the voltages of the active states before and after the resonance.

Any attempt at estimating the resonance sequence duration and the ZVS transitions duration can require complex computations, which can be difficult or impossible to implement in real-time, and can yield fuzzy estimates. Accordingly, "Circuit A," disclosed herein, can provide valuable information by precisely positioning the ZVS transition phases throughout the switching cycle, as indicated by the resonant capacitor discharge monitoring signal(s) generated (i.e., first sensing signal(s)), as well as accurately measuring their durations. This information can be used in the two sub-switching cycle control methods presented in the following, and can apply to all S4T and SSCSI converter variants.

Exemplary Implementation of Circuit A

Figure 7:
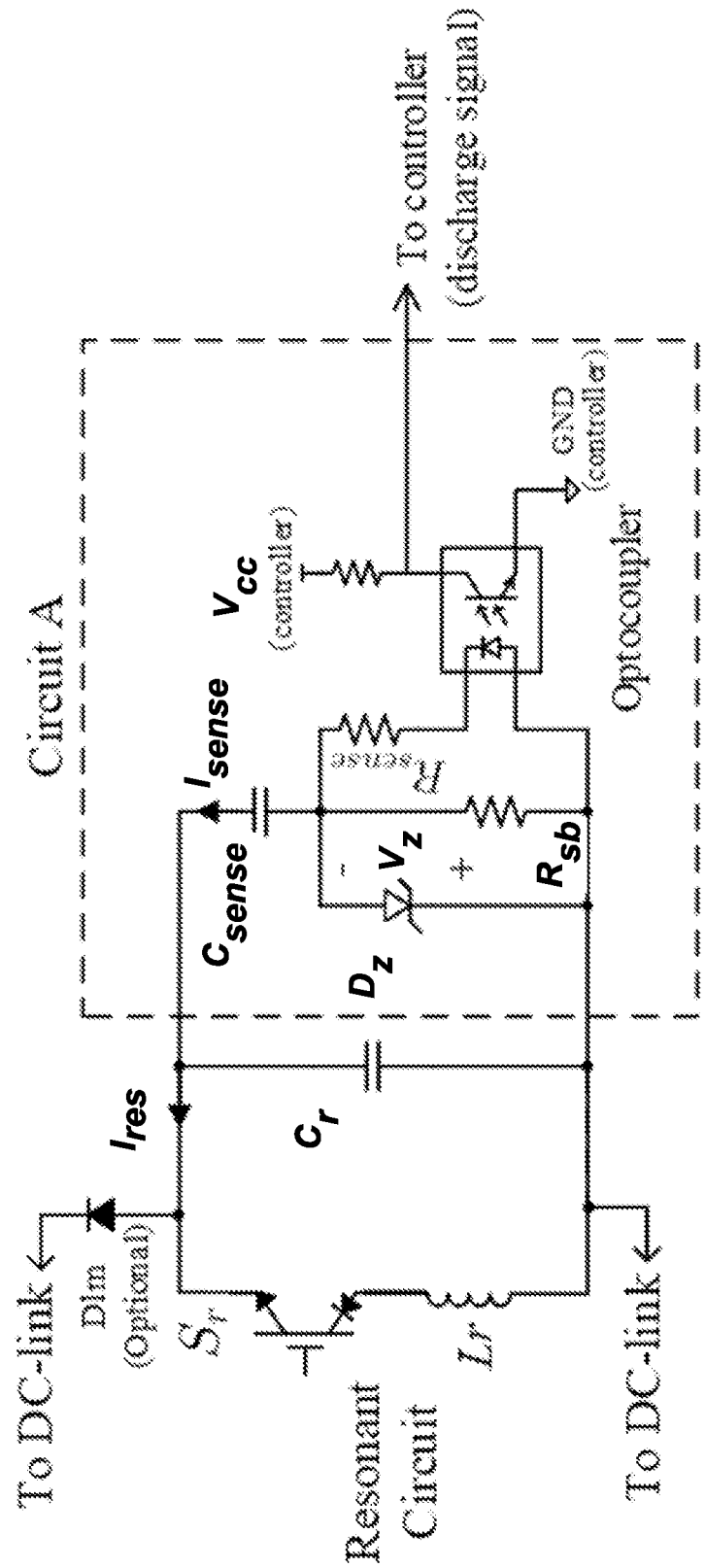
FIG. 7 provides a first sensing circuit, in accordance with an exemplary embodiment of the present disclosure.

An exemplary implementation of the first sensing circuit—"Circuit A"—is shown in FIG. 7. As shown in FIG. 7, Circuit A can connect in parallel to the resonant circuit capacitor $C_r$ and comprises a sensing capacitor $C_{sense}$, a sensing resistor $R_{sense}$ and a low-propagation delay optocoupler (or other device/circuitry providing similar functionality). A zener diode $D_z$ (or other device/circuitry providing similar functionality) is also added in parallel to the $R_{sense}$—optocoupler branch to protect the optocoupler from damaging current levels by bypassing the excess sensing current $I_{sense}$ while providing the desired sensitivity level. An optional bias resistor, $R_{sb}$, in parallel to the zener diode, might also be added to increase noise-immunity depending on the application.

Circuit A can monitor the discharge of the resonant circuit capacitor $C_r$ as follows. $C_{sense}$ and $C_r$ form a capacitive current divider for the main resonant current $I_{res}$. A small fraction of this current, $I_{sense}$, flows through Circuit A such that:

$$I_{sense} \approx \frac{C_{sense}}{C_r + C_{sense}} I_{res}$$

$C_{sense}$ is chosen so that $I_{sense} \ll I_{res}$, that is $C_{sense}$ can be orders of magnitude smaller than $C_r$, which can decrease its cost. Furthermore, the addition of Circuit A does not interfere with the resonant circuit and the operation of the converter.

The zener diode voltage $V_z$, the sensing resistor $R_{sense}$, and the optional bias resistor $R_{sb}$, can be selected according to the optocoupler pick up current and voltage and maximum operating current and voltage, the maximum resonant current, and the target minimum discharge resonant current to be sensed, $I_{res\_min} > 0$.

When $I_{res} \geq I_{res\_min}$, meaning that $C_r$ is being discharged, $I_{sense} \geq 0$ and a portion of this sensing current can flow through the sensing resistor and the diode of the optocoupler, turning on the phototransistor. The rest of the sensing current can be bypassed by the zener diode, if needed. Similarly, when $I_{res} \leq 0$, indicating that $C_r$ is being charged or the circuit is open, $I_{sense} \leq 0$ and the zener diode can bypass the integrality of the sensing current, leaving the phototransistor open. If $0 \leq I_{res} \leq I_{res\_min}$, the resonant capacitor is being discharged, but the resonant current is below the sensitivity of the sensing circuit, and the phototransistor is OFF.

The resulting phototransistor switching can be scaled to the logic level of the controller, $V_{cc}$, through a pull-up resistor, with the understanding that a pull-down structure or an optocoupler with integrated push-pull stage could also be used. Thus, Circuit A can provide a low-cost solution to generate an isolated signal with minimum propagation delay compatible with the controller logic level, and monitor the discharge of the resonant tank capacitor $C_r$ with high fidelity. It should be noted that the capacitor $C_r$ also limits the dv/dt that the optocoupler sees, allowing the use of lower cost optocouplers.

The discharge signal generated by Circuit A can be used in the two novel sub-switching cycle control methods discussed next.

End of Resonance Control Method

Figure 8:
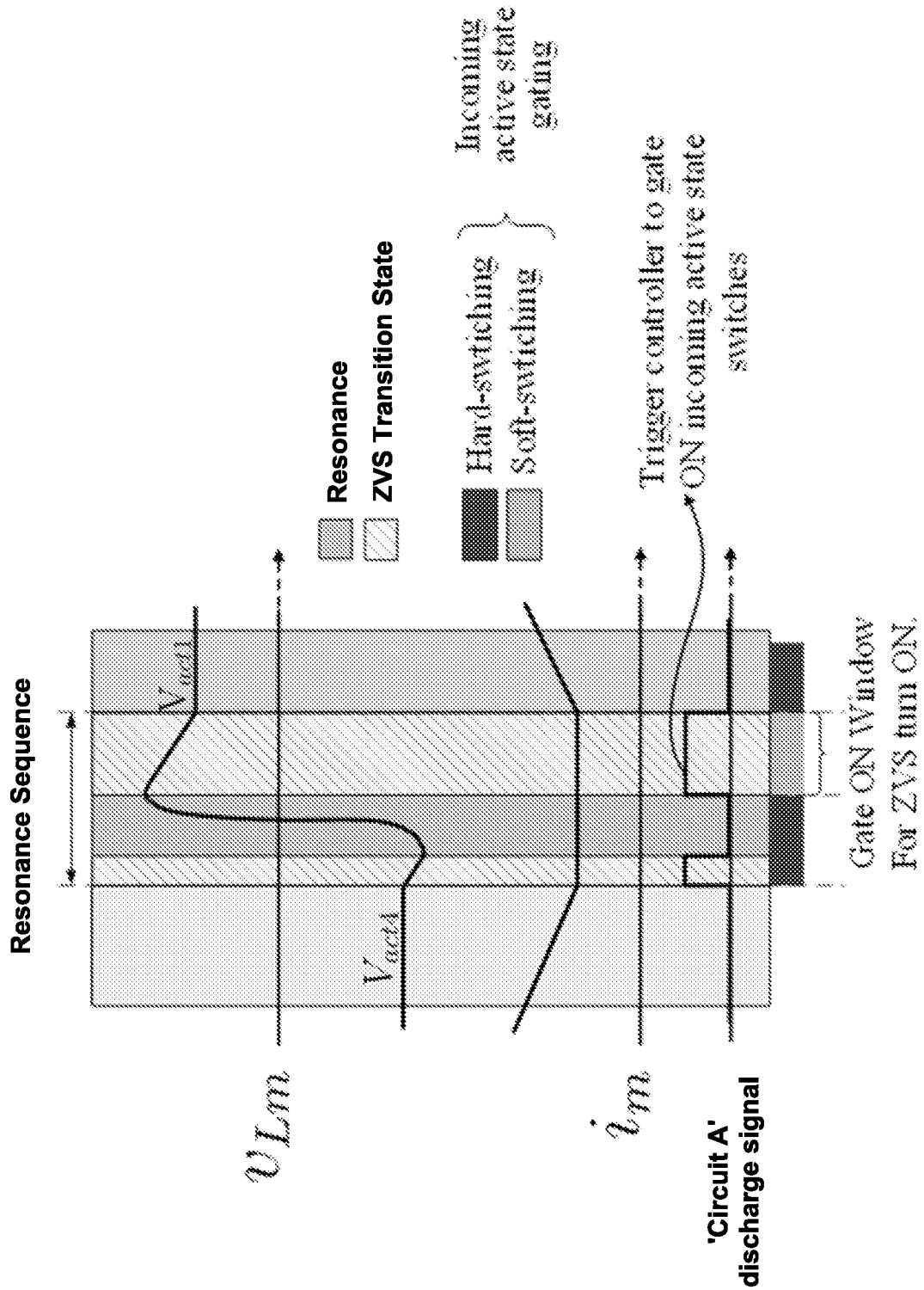
FIG. 8 provides a resonance sequence structure with incoming state gating window and Circuit A discharge signal, in accordance with an exemplary embodiment of the present disclosure.

As shown in FIG. 8, a complete resonance sequence finishes with a ZVS transition phase to the next incoming active state, $V_{act1}$ in this example. This implies that the switches in the converter bridge(s) corresponding to the active state can be gated ON at any instant during this final ZVS transition state for the soft-switching action to occur. More specifically, turning the switches on at any point before or after this window will lead to a hard-switching action and should be avoided, as highlighted in FIG. 8. The higher-level converter's controller typically has no knowledge of the resonance sequence duration and of the final ZVS transition state positioning within the resonance sequence. A conventional implementation has been to use an opportunistic approach where a fixed resonance sequence duration is assumed to attempt to artificially position the gating ON of the switches within the allowable window, without guarantee of success. Another conventional approach is to estimate the resonance sequence duration and final ZVS transition state positioning, at the cost of complex computations, often too intensive to be implemented in real-time, in addition to the disadvantages and uncertainties associated with this method as detailed above. Both these approaches can lead to acceptable performances under steady-state conditions for applications with fixed voltage conversion ratio, but cannot guarantee the soft-switching transition under transient modes and for wide input/output voltage variations.

In a proposed novel control method, referred to herein as the "End of Resonance Control," the discharge signal from the Circuit A of the resonant module of interest (i.e., the first sensing signal) can be used to accurately locate the final ZVS transition phase within the resonance sequence and trigger the controller to turn ON the appropriate devices in the converter bridge(s) for the incoming active state, as shown in FIG. 8. This can guarantee that the incoming switches will be turned ON during the allowable window for a soft-switching operation, under both steady-state and transient conditions, for all application variants, including applications with wide input/output voltage excursions and implementations with large number of input and outputs. This can significantly improve the safety and performance of the class of soft-switching current source converters.

This exemplary control method can apply to all S4T and SSCSI implementations (or other soft-switching current source converters) and to any number of resonant tanks/modules used by the particular application. If multiple resonant modules and first sensing circuits are used, the discharge signals (i.e., first sensing signals) from the resulting number of Circuit A sensing circuits can be reconciled and exploited to detect the appropriate incoming active state gating window and gate ON the corresponding switches.

ZVS Transition Time Measurement Method

Figure 9:
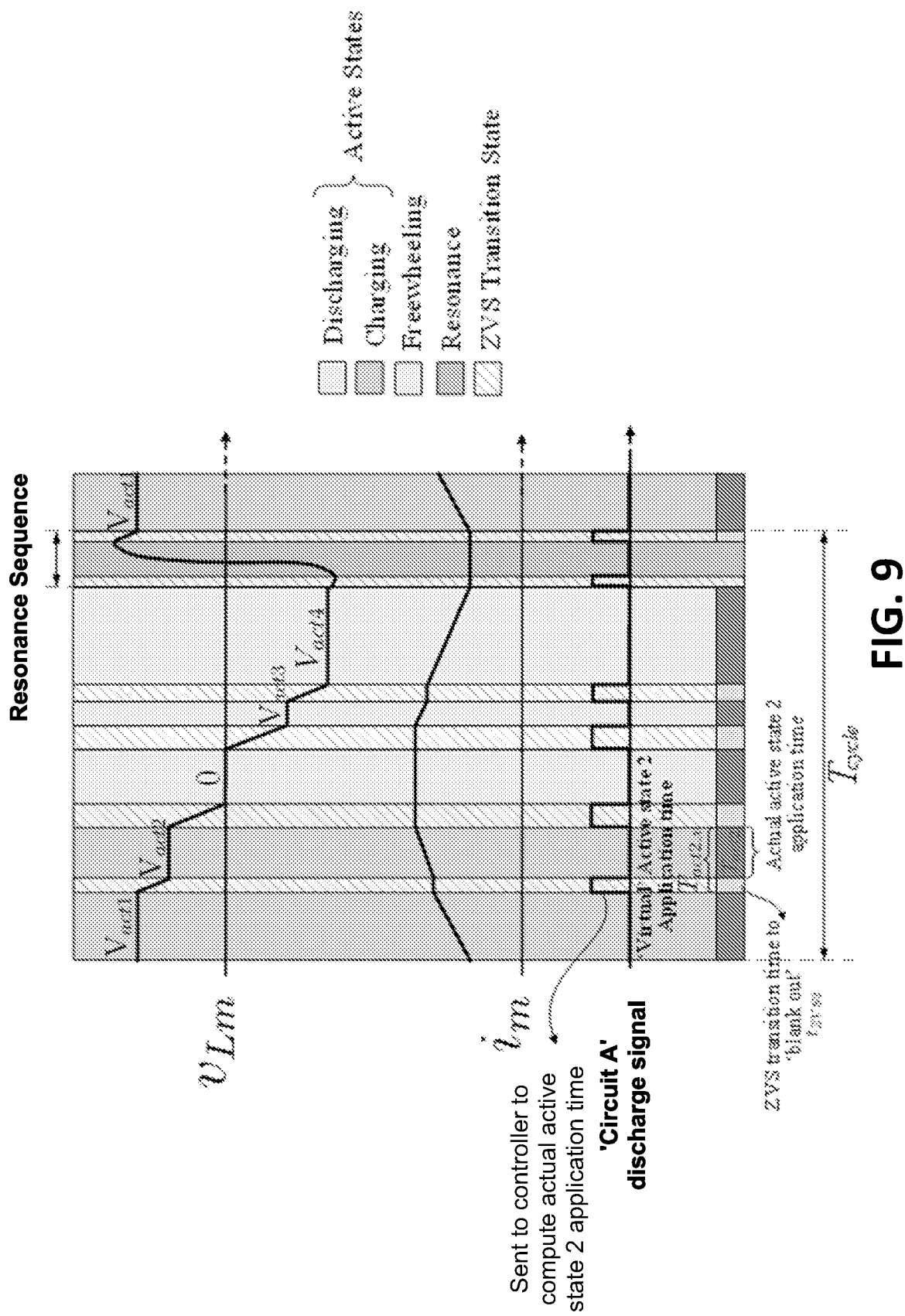
FIG. 9 illustrates the effect of ZVS transition states on Active states application time and an exemplary correction mechanism using first sensing signal from the first sensing circuit, in accordance with an exemplary embodiment of the present disclosure.

As for any resonant or quasi-resonant converters, the instant of commutation of the main power switches in the S4T and SSCSI is not known, owing to the resonant transition process enabling the soft-switching feature. This is shown in FIG. 9 for a typical S4T switching cycle with the aforementioned ZVS transition states existing between every active state. While the converter's controller triggers a switching state change at the end of an active state to the next one, following some higher-level modulation scheme, the actual application time of the new state is diminished by the ZVS transition time between the two states. Taking the example of active state 2, $V_{act2}$, in FIG. 9, the "virtual" application time, $T_{act2\_v}$, corresponding to the application time targeted by the controller, the ZVS transition time, $t_{ZVS2}$, and the actual application time, $T_{act2}$, can be such that:

$$T_{act2}=T_{act2\_v}-t_{ZVS2}$$

The total duration of these ZVS transitions can be kept low compared to the total cycle duration through appropriate design. Yet, these transitions can increasingly amount to a non-negligible portion of the active states as the converter loading level decreases, leading to an increased total-harmonic distortion (THD) on the inputs and outputs, especially under light-load conditions. As discussed above, the ZVS transition states durations are unknown and can vary on a sub-switching cycle basis, so that standard closed loop control on the input and output quantities may not provide the bandwidth needed to address this variability and associated THD impact.

Accordingly, in some embodiments of the present disclosure, the discharge signal from the appropriate Circuit A and resonant module can be used to account for the duration of the ZVS transitions between active states. With this novel correction method, referred to herein as the "ZVS Transition Time Measurement," the appropriate resonant capacitor discharge signal (i.e., first sensing signal) can be sent to the controller to "blank out" the ZVS transition state duration to the corresponding active state and lead to an actual application time closer to the target value. Taking the example of active state 2 in FIG. 9 again, the discharge signal from Circuit A gives the value of $t_{ZVS2}$ so that the controller selects state 2 virtual duration, $T_{act2\_v}$, to be equal to the target actual application time, $T_{act2}$, added with the ZVS transition state duration $t_{ZVS2}$:

$$T_{act2\_v}=T_{act2}+t_{ZVS2}$$

Once again, this control method can be agnostic to the operational implementation of the S4T or SSCSI (or other) converter, including the higher-level modulation scheme used, and to the number of resonant modules and associated Circuit A.

Figure 10:
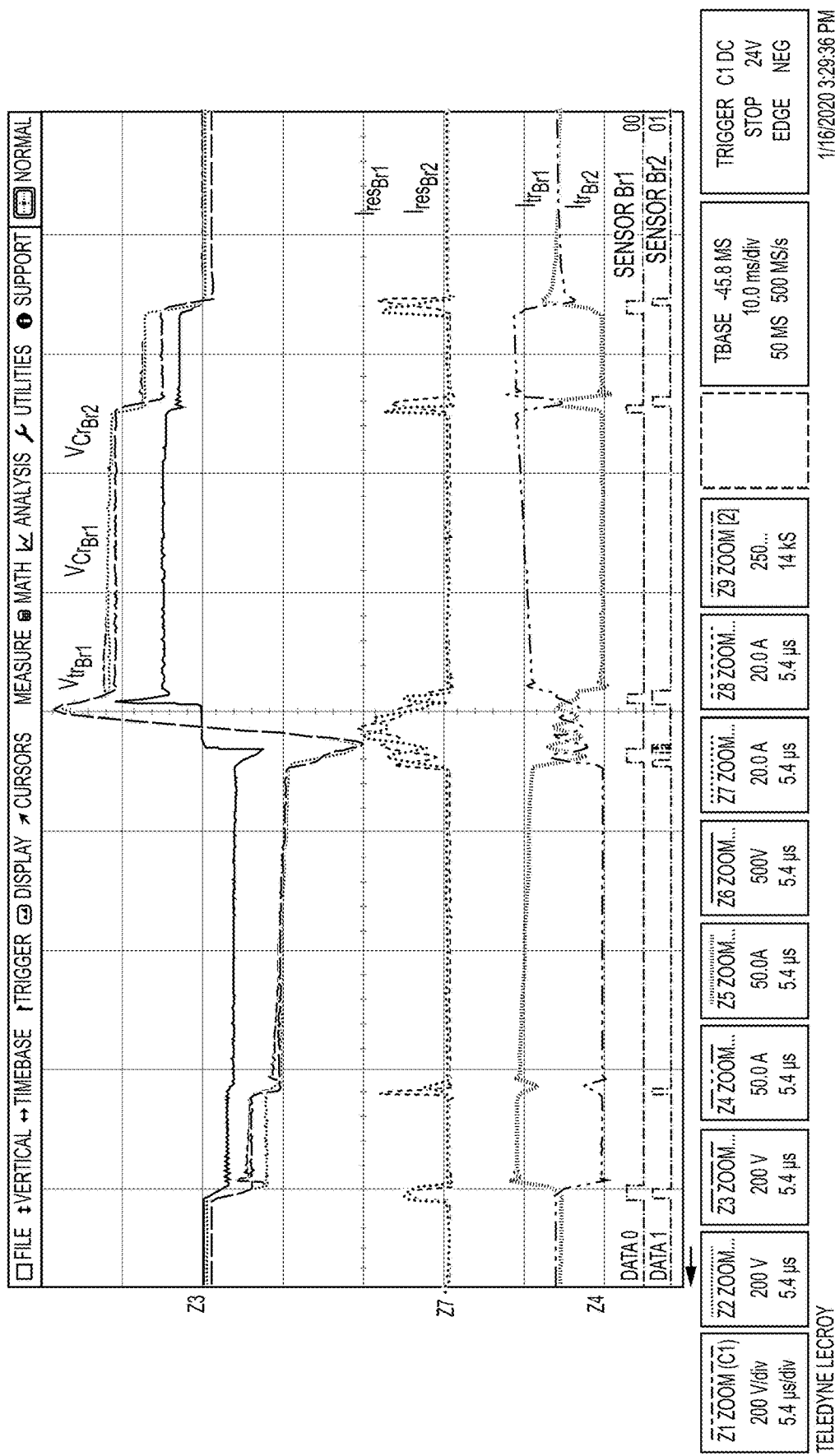
FIG. 10 illustrates experimental validation of a first sensing circuit, in accordance with an exemplary embodiment of the present disclosure.

An exemplary discharge monitoring Circuit A implementation has been tested in a typical S4T converter to demonstrate functionality. Two resonant modules were used in this implementation, along with two Circuit A sensors—one per bridge. The resulting experimental waveforms are shown in FIG. 10. As shown in FIG. 10, both Circuit A sensors accurately monitor the discharge of their respective resonant capacitor, with the sensing signals $Sensor_{Br1}$ and $Sensor_{Br2}$ asserted high when $I_{res_{Br1}}>0$ and $I_{res_{Br2}}>0$, respectively.

Circuit B: Voltage Threshold Detection Circuit and Associated Control Methods The second sensing circuit, also referred to herein as "Circuit B" and control methods using the second sensing signal generated by Circuit B will now be discussed.

Resonant Capacitor Voltage Threshold Detection in Soft-Switching Current Source Converters The second sensing information disclosed herein for a sub-switching cycle control of the converters and of the resonance sequences is the detection of a threshold voltage level on the resonant capacitor $C_r$ in the resonant tank circuit of the resonant module.

Figure 1:
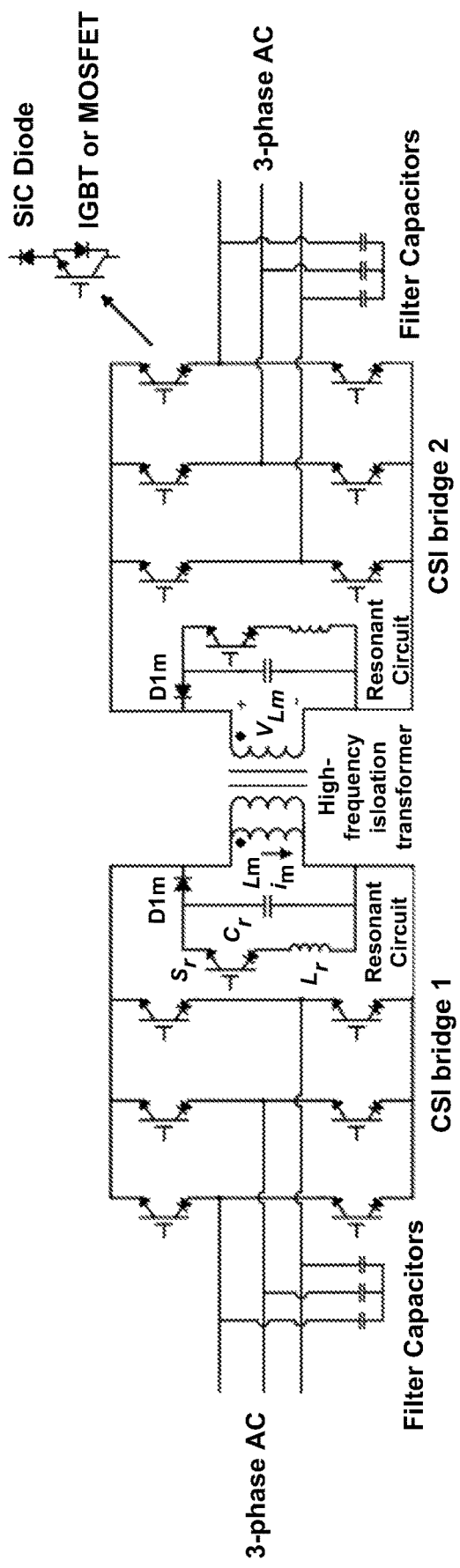
FIG. 1 provides a conventional three-phase to three-phase AC/AC implementation of a Soft-Switching Solid State Transformer (S4T) with high-frequency isolation, for use with embodiments of the present disclosure.
Figure 2:
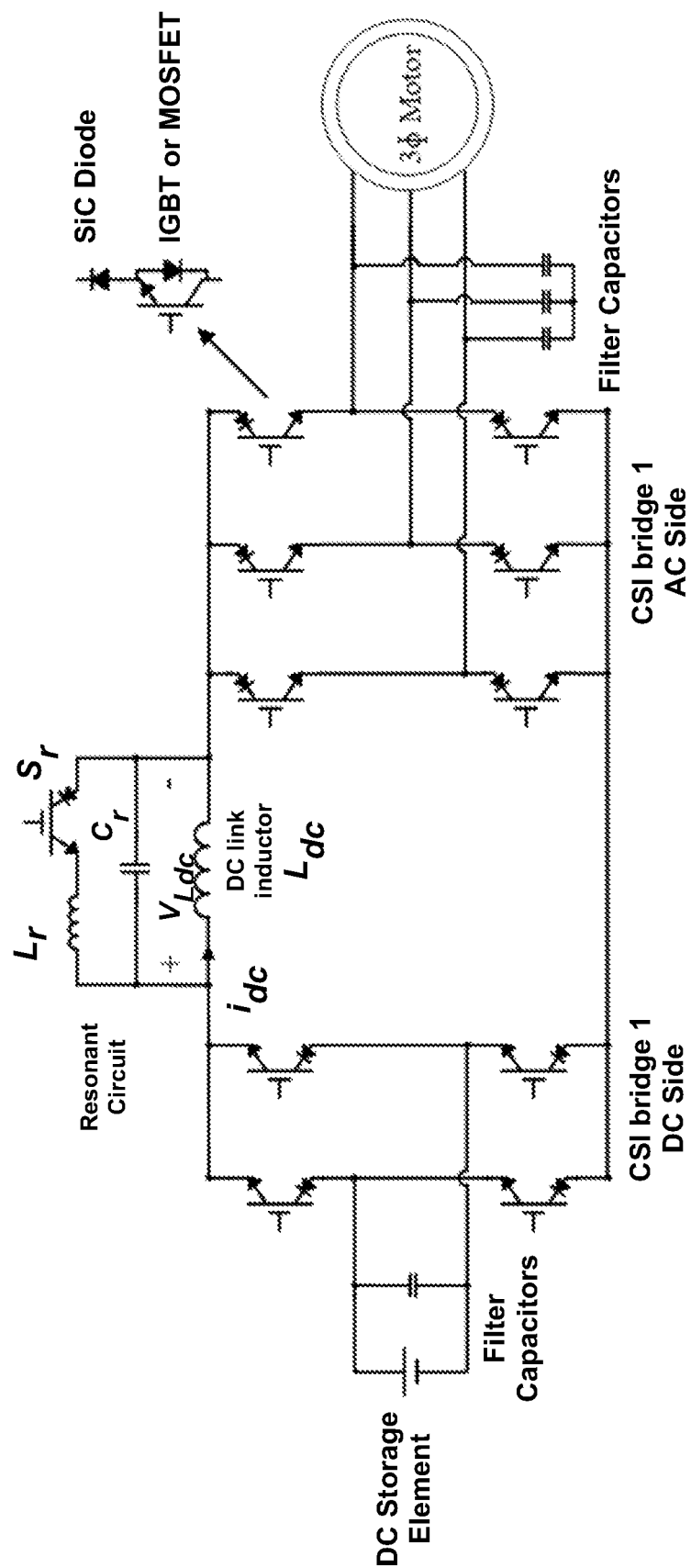
FIG. 2 provides a Soft-Switching Current Source Inverter (SSCSI) in a typical electric vehicle motor drive configuration, for use with embodiments of the present disclosure.
Figure 11:
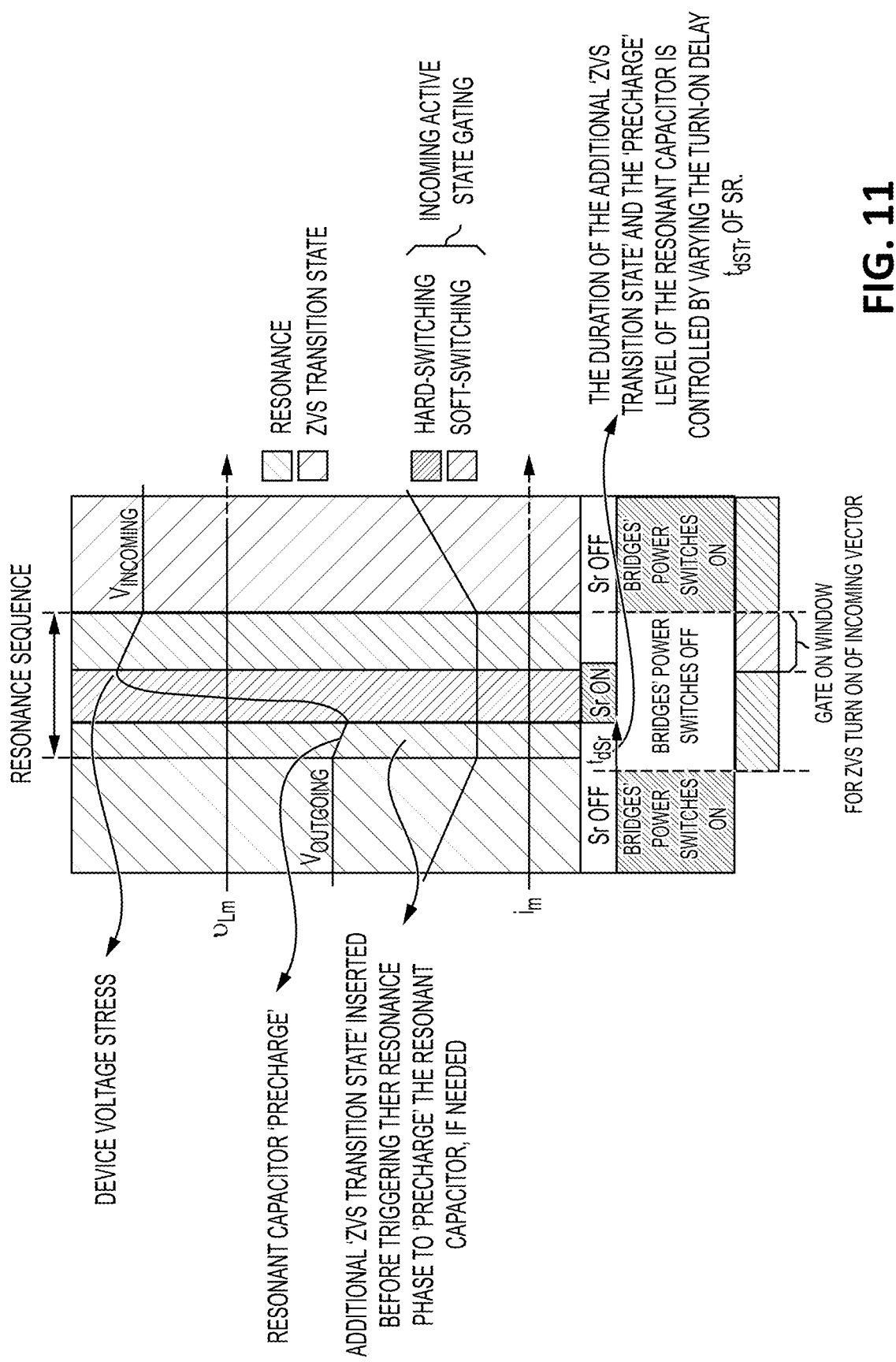
FIG. 11 illustrates a resonance sequence, with arbitrary voltage levels before and after the sequence, in accordance with an exemplary embodiment of the present disclosure.

Once again and without loss of generality, the AC/AC three-phase S4T converter shown in FIG. 1 is used as an example in the following. A typical resonance sequence, with arbitrary voltage levels before and after the sequence, is shown in FIG. 11.

Under all soft-switching current source converter variants (e.g., S4T or SSCSI), the resonance sequence can be used when a bridge transitions to a more positive "active vector"

voltage level. For this transition to happen under ZVS soft-switching conditions, a complete resonance sequence can be inserted between the two active vectors, the first active vector voltage being more negative or less than the second "more positive" active vector voltage. This is achieved, at the resonant tank level, by turning OFF all the bridge's power devices and gating ON the ancillary switch (sometimes referred to herein as "auxiliary switch" or "resonant switch") of the resonant tank, to trigger a resonance between the resonant elements $C_r$ and $L_r$. As shown in FIG. 11, a complete resonance sequence ends with a ZVS transition state where the resonant capacitor is discharged and the switches of the incoming active vector can be gated ON to ensure a ZVS turn ON. This is detailed above when discussing how Circuit A can be used to detect the allowable period for the ZVS transition to occur in the End of Resonance Control Method. As shown in FIG. 11, depending on the active voltage level before and after the resonance sequence, $V_{outgoing}$ and $V_{incoming}$, respectively in the figure, an additional ZVS transition state can be flexibly inserted at the beginning of the resonance sequence, by appropriately delaying the gating-on of the ancillary switch of the resonant tank, $S_r$, with a variable delay $t_{dS_r}$. This additional ZVS transition state can pre-charge the resonant capacitor further, if needed, by allowing it to reach a more negative voltage level to ensure a complete resonance sequence with a final ZVS transition to the incoming voltage level.

This freedom in the gating of the ancillary switch of the resonant tank, where a flexible delay $t_{dS_r}$ can be added between the turn OFF of the bridge's devices and the gating ON the ancillary switch, can be a key mechanism to enable the soft-switching operation of the soft-switching current source converters across the entire power, voltage, and current ranges. Depending on the converter operating conditions, the resonant capacitor can be pre-charged if needed through this additional ZVS transition state and auxiliary switch delay $S_r$. In essence if the outgoing and incoming voltage levels are such that $|V_{outgoing}| < V_{incoming}$ the gating ON of the ancillary switch can be delayed, whereas if $|V_{outgoing}| > V_{incoming}$ no delay may be necessary. This additional degree of freedom in the resonance sequence through the appropriate gating of the ancillary switch can essentially render the ZVS operation of the converters independent of the voltage and power conditions.

The gating of the ancillary switch $S_r$ can thus be important in the proper operation of the converters, yet has proven challenging in practical implementations. The implementation of a fixed $t_{dS_r}$ delay in the gating of the ancillary switch can lead to variable, and often unacceptable, device voltage stress as $V_{outgoing}$ varies with the converter operating conditions, in turn setting a variable maximum negative and positive voltage stress across the resonant capacitor and the power switches. It can also be very challenging to guarantee a soft-switching operation of the converters, especially for applications with a wide voltage range. Finally, a fixed resonant capacitor pre-charge duration $t_{dS_r}$ often times can generate large overvoltage across the power devices, leading to converter failure, under abnormal or fault conditions.

Another conventional approach is to estimate the pre-charge time and delay $t_{dS_r}$ required as function of $V_{outgoing}$ and $V_{incoming}$ through computations. However, the resonant tank is a high order circuit and the delay/pre-charge time required can depend non-linearly on a number of parameters and quantities including the tank passive elements values, $V_{outgoing}$, $V_{incoming}$ and the DC-link current value, amongst other factors. The computations involved can be complex and challenging, if not impossible, to execute in real-time, and the sensing bandwidth on the variable quantities used in the calculation can be limited, leading to limited dynamic performances and large overvoltage during converter transient. Furthermore, the unavoidable component variability and errors in the measurement can lead to large approximation errors and induce spurious hard-switching actions. An alternate implementation with off-line computations and a lookup table approach where pre-computed $t_{dS_r}$ delay values are used could be possible but would still suffer from limited measurement bandwidth on the fast-varying quantities used as input to the table, thus leading to overvoltage in case of converter transients.

To address these issues, disclosed herein is a second sensing circuit—Circuit B—used to detect a threshold voltage level on the resonant capacitor voltage (referred to herein as the "second sensing signal"), during the additional ZVS transition state added if needed to pre-charge the resonant capacitor, to realize a precise control of the resonant sequence and the gating of the ancillary switch $S_r$. Rather than tracking the full voltage excursion of the resonant capacitor during the resonance sequence, with dynamics typically well above 1 MHz, rendering an accurate and continuous sensing of this voltage extremely challenging, only the detection of the instant when the resonant capacitor voltage crosses a target threshold voltage level, i.e when the resonant capacitor voltage is less than or equal to a threshold voltage level, is more negative than a threshold voltage level, is used in these converters and proposed control method. This minimal sensing information can be accurately captured in the proposed resonant module using a low-cost and low-delay sensing circuit, Circuit B, and in all S4T and SSCSI converter variants (as well as in other converters).

The new "Pre-charge Control Method" disclosed herein can leverage this threshold detection (second sensing signal) from Circuit B, together with the discharge signal (first sensing signal) from Circuit A, to offer a simple, cost-effective and reliable solution to controlling the gating of the ancillary resonant switch $S_r$ within the resonant module and during the resonance sequence, with appropriate delay $t_{dS_r}$, if needed, and ensure a soft-switching operation of the converters under most, if not all, power, voltage, and current conditions. This control method, discussed below, can limit the devices voltage stress to a minimum, including under converter transient and faults for a safe operation of the converter and a maximum utilization of the power devices voltage capabilities. The losses in the resonant tank can also be minimized.

Exemplary Implementation of Circuit B

Figure 12:
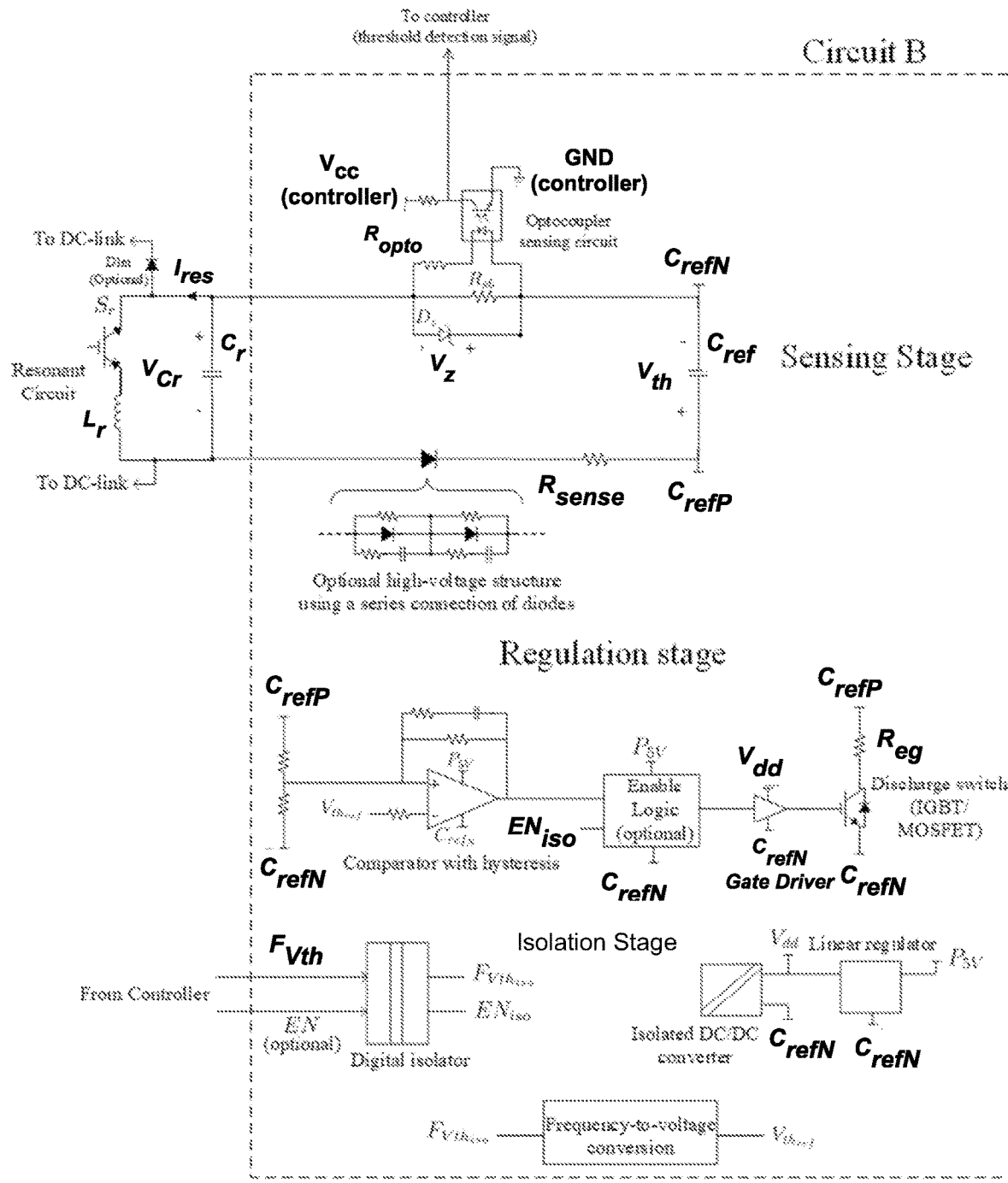
FIG. 12 provides a second sensing circuit, in accordance with an exemplary embodiment of the present disclosure.

Circuit B provides a simple and cost-effective solution to detect, with minimum propagation delay and high bandwidth, the instant when the resonant capacitor voltage $V_{cr}$ becomes less than or equal to a given threshold voltage $-V_{th}$. Depending on the application, the threshold voltage $-V_{th}$ of Circuit B can be fixed or variable/controllable. FIG. 12 shows an exemplary implementation with a controllable threshold voltage $-V_{th}$.

The exemplary implementation of Circuit B shown in FIG. 12 uses a novel "sensing stage" connected directly across the resonant capacitor of the resonant circuit within the resonant module. The "sensing stage" comprises a reference capacitor, $C_{ref}$, an optocoupler sensing circuit, a series sensing resistor, $R_{sense}$, and a series diode. For some applications, the voltage blocking capability of a single diode might not be sufficient and a series connection of multiple diodes might be used instead, with appropriate balancing and RC snubber networks, if required. The series diode can be forward biased for $V_{cr} \leq -V_{th}$ and the corresponding current flow through the sensing stage can trigger the opto-coupler sensing circuit. This in turn can generate a logic signal (second sensing signal) used by the controller to detect the instant where $V_{cr} \leq -V_{th}$.

The optocoupler sensing circuit can follow the same principles and design considerations as in Circuit A. The series sensing resistor $R_{sense}$ and the reference capacitor $C_{ref}$ can be selected to limit the maximum sensing current through the sensor while ensuring minimum sensing delay, sufficient $V_{th}$ threshold control dynamic, and low power loss. Enough energy storage can be used in the reference capacitor $C_{ref}$ to minimize the voltage ripple on the threshold voltage $V_{th}$, arising from the pulsatile operating principle of the sensing circuit.

A "regulation stage" can be connected across the reference capacitor $C_{ref}$ to regulate its voltage $V_{th}$, determining the threshold detection voltage. An exemplary implementation of this regulation stage is shown in FIG. 12, using a simple hysteresis control. A discharge circuit made of the series connection of a controllable switch (MOSFET or IGBT) and a discharge resistor $R_{eg}$ is connected across the reference capacitor $C_{ref}$. The controllable switch is gated ON to discharge the reference capacitor through $R_{eg}$, when required. The voltage rating of the switch can be determined by the maximum threshold voltage magnitude to be detected with the sensor, and the discharge resistor $R_{eg}$ is sized to limit the discharge current and provide appropriate control bandwidth on the threshold voltage. A "low-side" configuration of the active switch can be used to avoid additional isolation requirement between the control logic and the reference capacitor.

The exemplary threshold voltage control logic operates as follows. The voltage across the reference capacitor $V_{th}$ is sensed through a resistive voltage divider and fed to a comparator in a hysteresis configuration. The output voltage of the hysteresis stage is optionally fed to a logic circuitry to provide the possibility to disable the reference capacitor voltage regulation, through an external "enable" signal, "EN." This might be uses in some applications to save energy and decrease the power rating of the discharge circuit. The resulting control signal is fed to a gate driver controlling the switch of the discharge circuit. The comparator also receives a reference voltage, $V_{th_{ref}}$, set by the controller as described next, and triggers the switch of the discharge circuit to keep $V_{th}$ within a pre-defined error band (hysteresis band). The hysteresis-band, and the corresponding comparator circuitry, can be chosen from a trade-off between regulation accuracy and maximum operating frequency of the discharge switch.

The last stage of the exemplary implementation shown in FIG. 12 is the "isolation stage." This stage provides the isolation between the regulation circuitry and the controller, and generates the isolated power used for the operation of the electronics and gate driver. In this exemplary implementation, the isolation is provided via a simple isolated DC/DC converter and the control signals from the controller are isolated using a conventional digital isolator. The reference voltage fed to the hysteresis comparator $V_{th_{ref}}$ is generated locally from the digital signal sent by the controller, $F_{Vth}$, using a frequency-to-voltage conversion based on a charge pump circuitry and active filtering. This provides a simple and cost-effective digital-to-analog conversion with isolation, although more advanced conversion techniques can be used in more demanding applications.

Figure 13A:
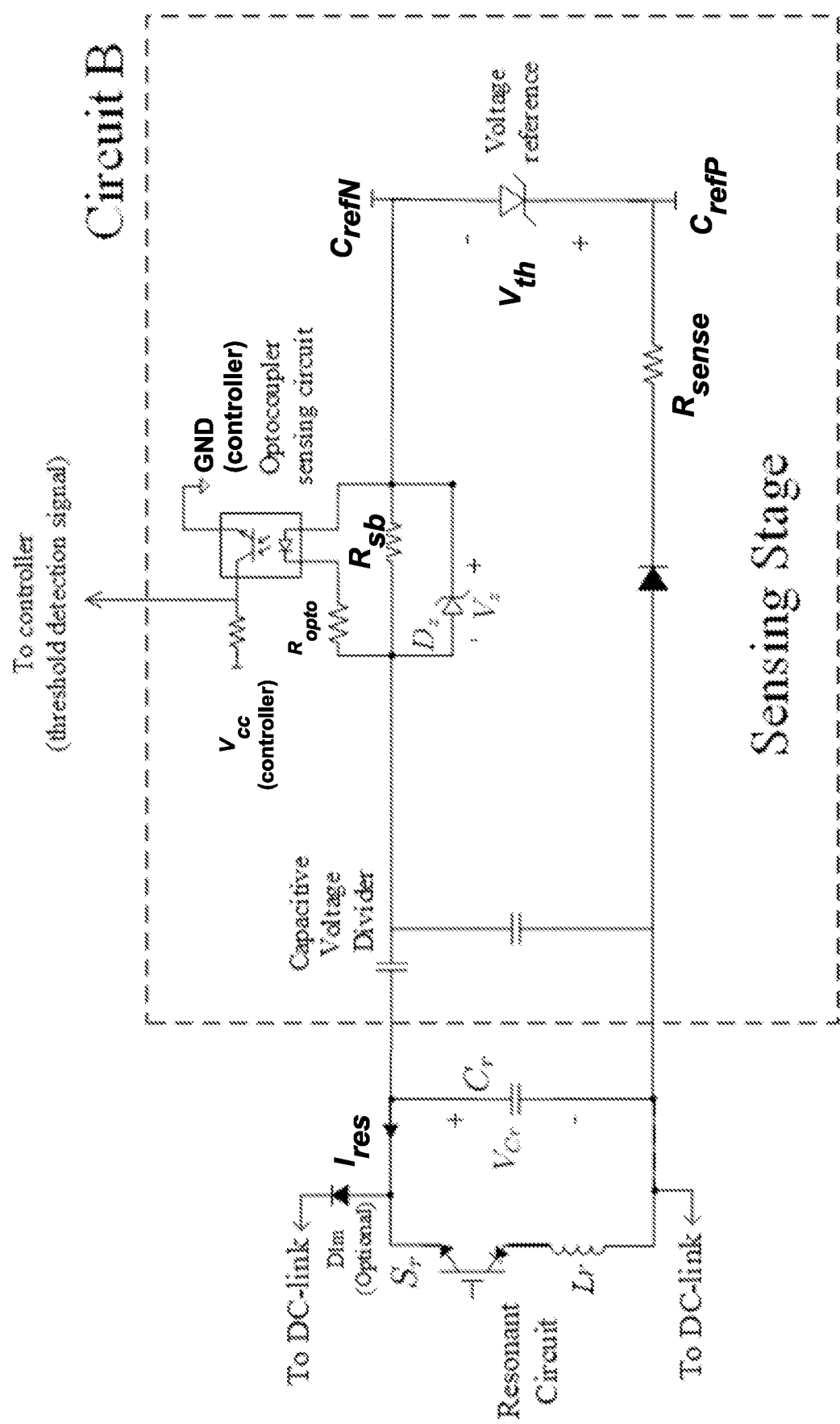
FIGS. 13A and 13B provide a second sensing circuits, in accordance with an exemplary embodiments of the present disclosure.

In some applications, a fixed threshold voltage detection, with $V_{th}$=cste, might be sufficient. An exemplary implementation of this simplified version of Circuit B with fixed threshold voltage is shown in FIG. 13A. In this exemplary implementation, the resonant capacitor voltage, $V_{Cr}$, is first scaled down through a capacitive voltage divider connected in parallel with the resonant capacitor of the resonant module. This scaled-down voltage is then fed to the sensing stage, with a similar configuration to the one described above. For this fixed threshold voltage implementation, the reference capacitor is replaced by a fixed voltage reference that can be as simple as a Zener diode as shown in FIG. 13. Depending on the operating voltage of the sensor, the sensing diode and voltage reference can be realized by the series connection of multiple lower-voltage elements, with appropriate balancing network and snubber circuits. In this simplified implementation, the regulation stage and isolation stage are not used, and the fixed threshold voltage detected by the sensor is determined by the selection of the fixed voltage reference or Zener diode characteristic and the scaling ratio (sometimes referred to as voltage ratio or conversion ration) of the capacitive voltage divider.

Figure 13B:
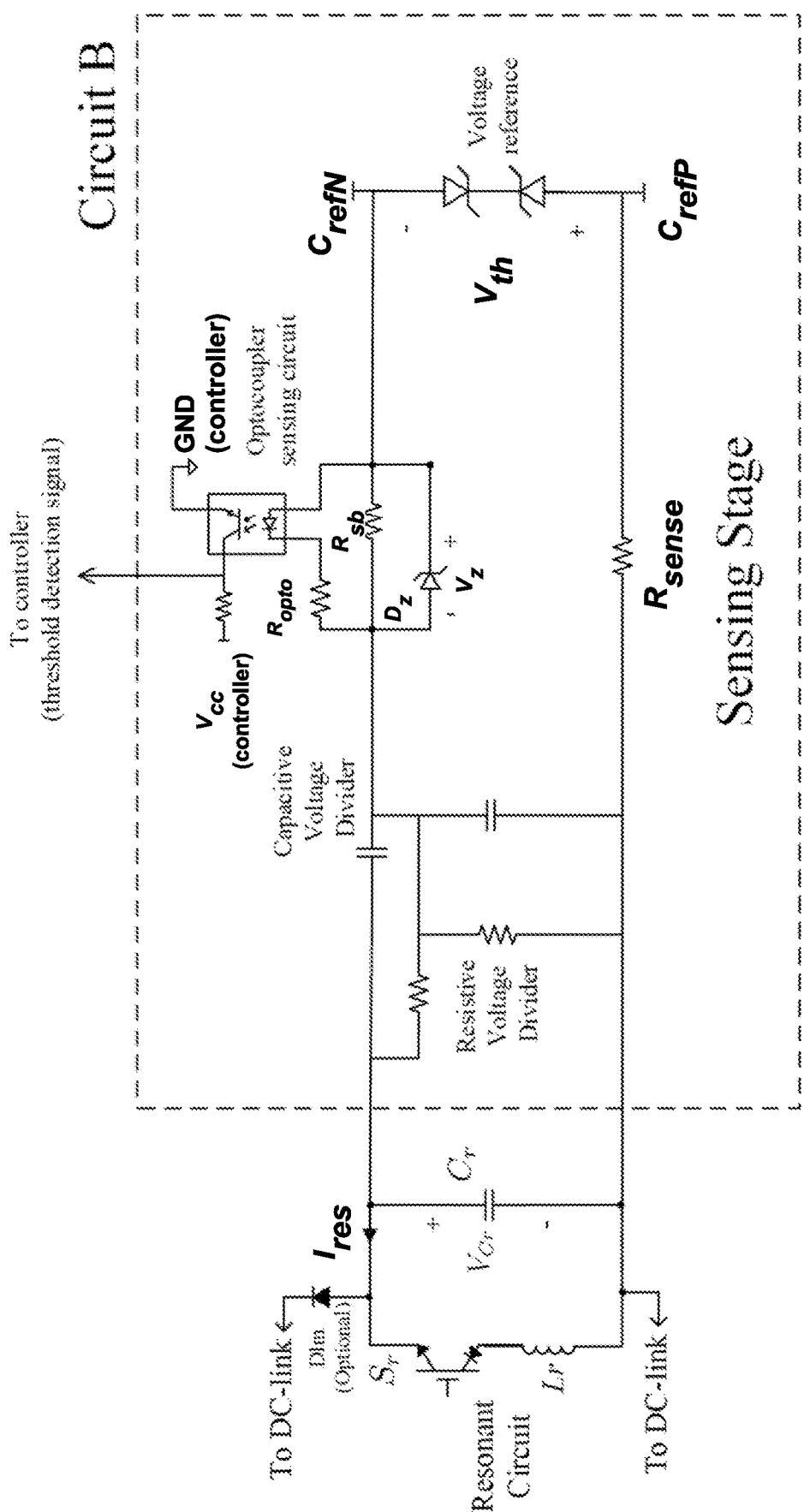

Another exemplary implementation of this simplified version of Circuit B with fixed threshold voltage is shown in FIG. 13B. In this exemplary implementation, the resonant capacitor voltage, $V_{Cr}$, is first scaled down through a capacitive voltage divider connected in parallel with the resonant capacitor of the resonant module. An additional resistive voltage divider is added in parallel to the capacitive voltage divider and connected to the same reference mid-point, to mitigate any steady-state offset in the scaled-down voltage. Both the capacitive voltage divider and the restive voltage divider are designed to have similar scaling ratios. This scaled-down voltage is then fed to the sensing stage, with a similar configuration to the one described above. For this fixed threshold voltage implementation, the reference capacitor is replaced by a fixed voltage reference that can be as simple as a series connection of two Zener diodes in opposite orientation as shown in FIG. 13B. The need for an additional sensing diode can be eliminated. In this simplified implementation, the regulation stage and isolation stage are not used, and the fixed threshold voltage detected by the sensor is determined by the selection of the fixed voltage reference or Zener diode characteristics and the scaling ratio of the capacitive and resistive voltage divider.

The number of resonant tanks used to enable the soft-switching operation can depend on the converter type (e.g., S4T or SSCSI) and configuration, and the number of resonant modules with integrated resonant tank circuits, and Circuit B can be adjusted accordingly. In addition, it can be beneficial to detect more than one threshold voltage per resonant sensor in applications where multiple resonance sequences are used per switching cycle. This can be achieved by implementing multiple Circuit B sensors per resonant circuit to form the resonant module. Regardless of the actual number of Circuit B's used, the fundamental structure of the sensor can remain unchanged, and can be simply duplicated as needed. The corresponding threshold detection signal(s) can be relevant in all application variants and can be used and reconciled to establish a novel resonance sequence control method as described below.

Pre-Charge Control Method

Figure 14:
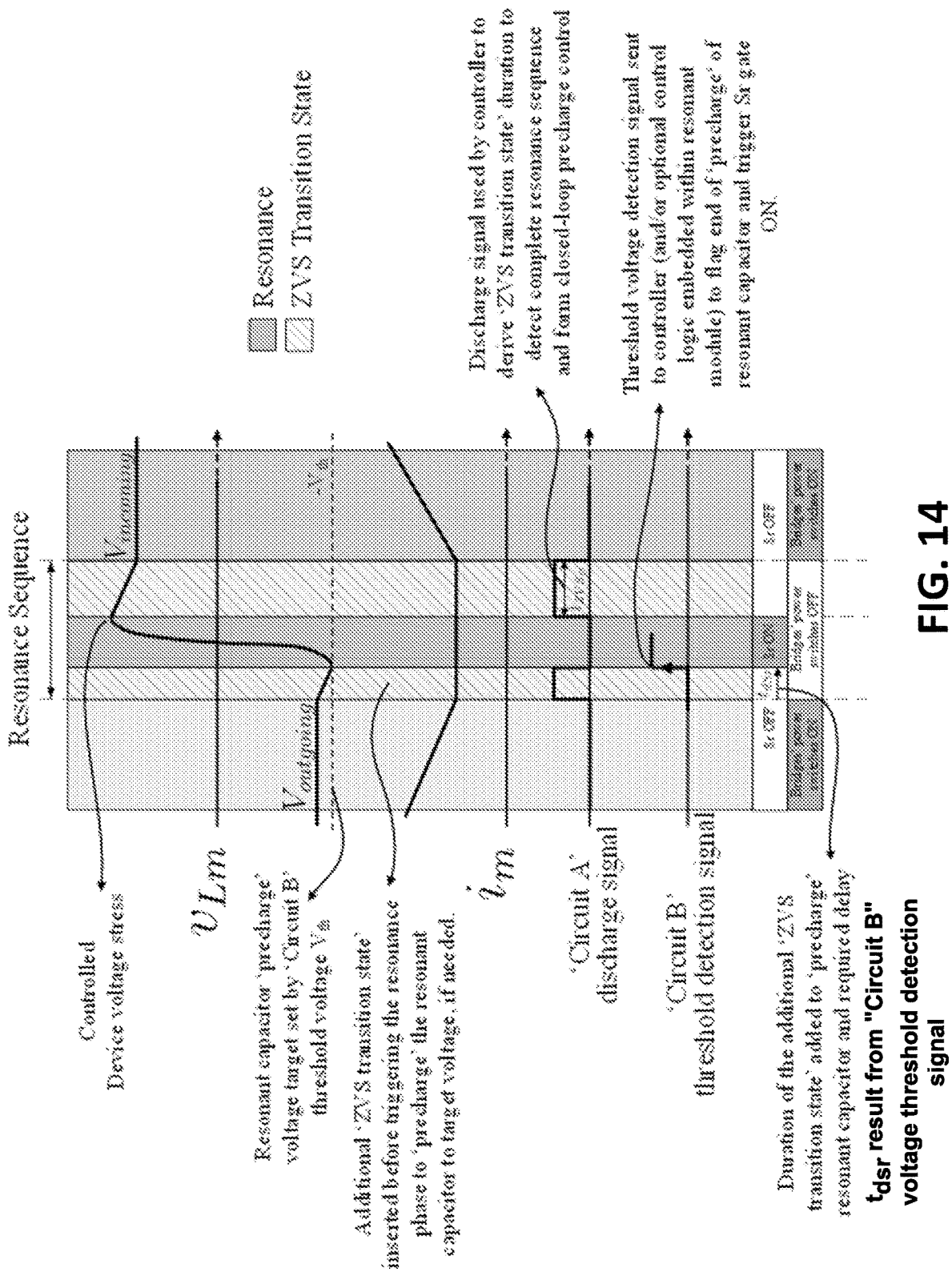
FIG. 14 illustrates a pre-charge control method using first and second sensing signals, in accordance with an exemplary embodiment of the present disclosure.

At the resonant module level, the "pre-charge control" method can use the data from the two novel sensing circuits—Circuit A and Circuit B described above—to generate the appropriate gating for the ancillary switch $S_r$ of the resonant tank. Both circuits can have minimum delay, leading to excellent control bandwidth, sufficient to guarantee a safe operation even under converter transients and faults. In essence, the new control method synchronizes the gating ON of the ancillary switch $S_r$ with the voltage threshold detection signal generated by Circuit B, as shown in FIG. 14. This leads to a robust control of the pre-charge of the resonant capacitor of the resonant module, where the capacitor voltage can be consistently pre-charged to the threshold voltage $-V_{th}$ set by Circuit B before triggering the resonance by turning on the ancillary switch $S_r$. Unlike conventional approaches where accurate sensing of variable quantities ($V_{outgoing}$, $V_{incoming}$, DC-link current) can be required to derive the delay on the gating of $S_r$ necessary to achieve the target pre-charge of the resonant capacitor, this novel method can use the detection of a threshold on the resonant capacitor voltage that can be achieved accurately, with minimum delay, and using the low-cost sensor circuit described above. Another difference with this new control method lies in the fact that the pre-charge voltage of the resonant capacitor can be directly controlled to a target value by detecting the threshold voltage, instead of relying on an indirect control based on gating delay estimations. This can lead to a safe operation, even under converter transients or faults, by limiting the capacitor pre-charge to the target value of $-V_{th}$ through direct sensing. Finally, this simple auxiliary switch gating strategy can optionally be implemented within the resonant module using local sensing data from the sensing circuits and some additional control logic circuitry for a semi-autonomous operation of the resonant module with minimum control delay.

It can be desirable for the target pre-charge voltage ($-V_{th}$) of the resonant capacitor of the resonant module to be sufficient enough to ensure a complete resonance sequence with a ZVS transition state to the incoming active vector at the end of the resonance. A complete resonance sequence can be detected using the capacitor discharge signal (i.e., first sensing signal) of Circuit A as follows. With the proposed End of Resonance control method described above, as soon as the resonant capacitor starts discharging, signaling the end of the resonance sequence, the switches of the incoming active vector can be gated ON. If the resonance sequence is complete, that is if a soft-switching turn-ON of the switches occurs, a ZVS transition state with non-zero duration $t_{ZVS_D}$, can take place to soft-switch to the incoming vector. Otherwise, if the resonance sequence is incomplete, that is if the resonant capacitor voltage at the end of the resonance is not large enough, a hard-switching to the incoming vector can occur and the ZVS transition state duration $t_{ZVS_D}$ detected by Circuit A can be close to zero. Thus, measuring the duration of the final ZVS transition state from the discharge signal of Circuit A can give a simple and robust method to determine if the resonance sequence is complete, as shown in FIG. 14.

Figure 15:
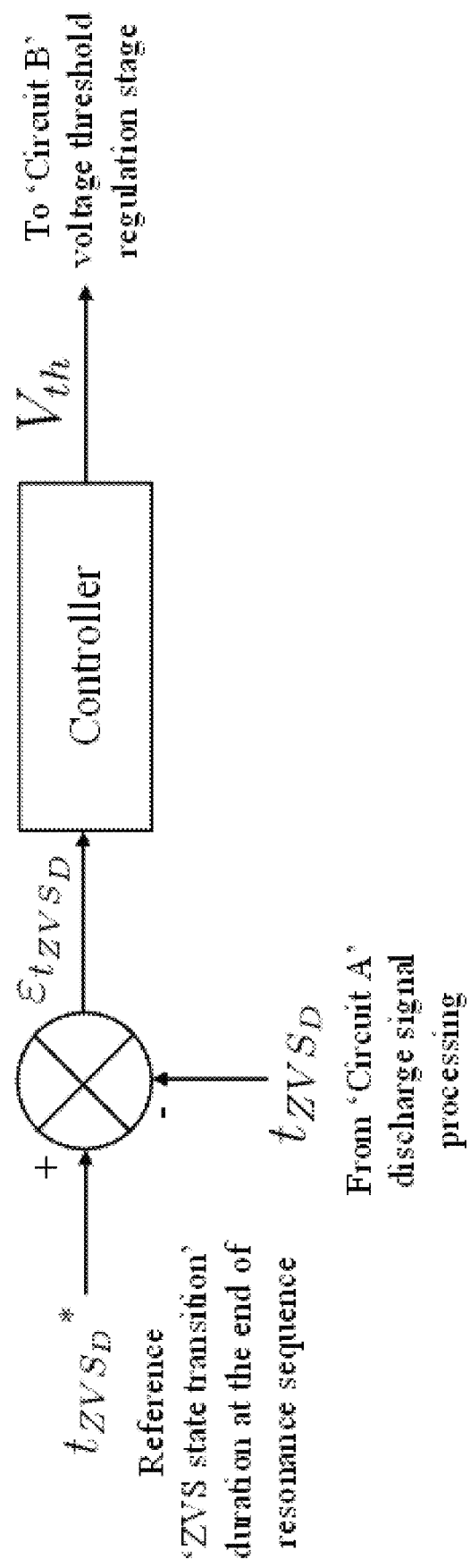
FIG. 15 provides a closed-loop control implementation of a pre-charge control method with regulation of $t_{SVS_D}$ to reference value through control of the threshold detection voltage of Circuit B, in accordance with an exemplary embodiment of the present disclosure.

This can be used in the proposed Pre-Charge Control method to form a "closed-loop" control of the target threshold voltage on the resonant capacitor, detected by Circuit B and at which the ancillary switch is gated ON. An exemplary control block diagram is shown in FIG. 15 where the duration of the ZVS transition state after the resonance, measured with Circuit A, can be regulated to a target duration by increasing or decreasing the threshold voltage at which switch $S_r$ is turned ON, using standard closed-loop control techniques.

Figure 16A:
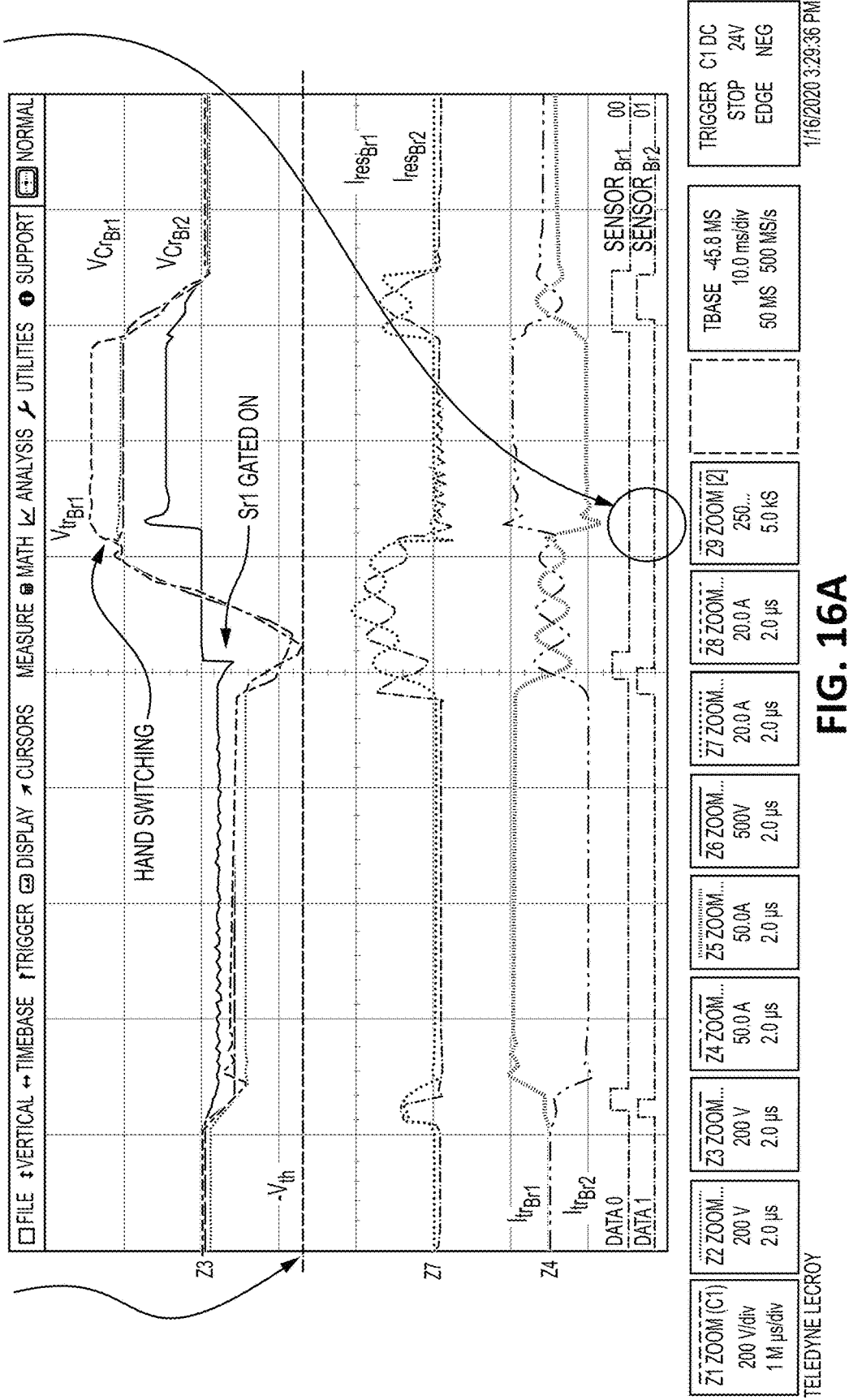
FIGS. 16A-B provides experimental demonstration of pre-charge control principles during the resonance sequence of a three-phase AC/AC S4T, in accordance with an exemplary embodiment of the present disclosure.
Figure 16B:
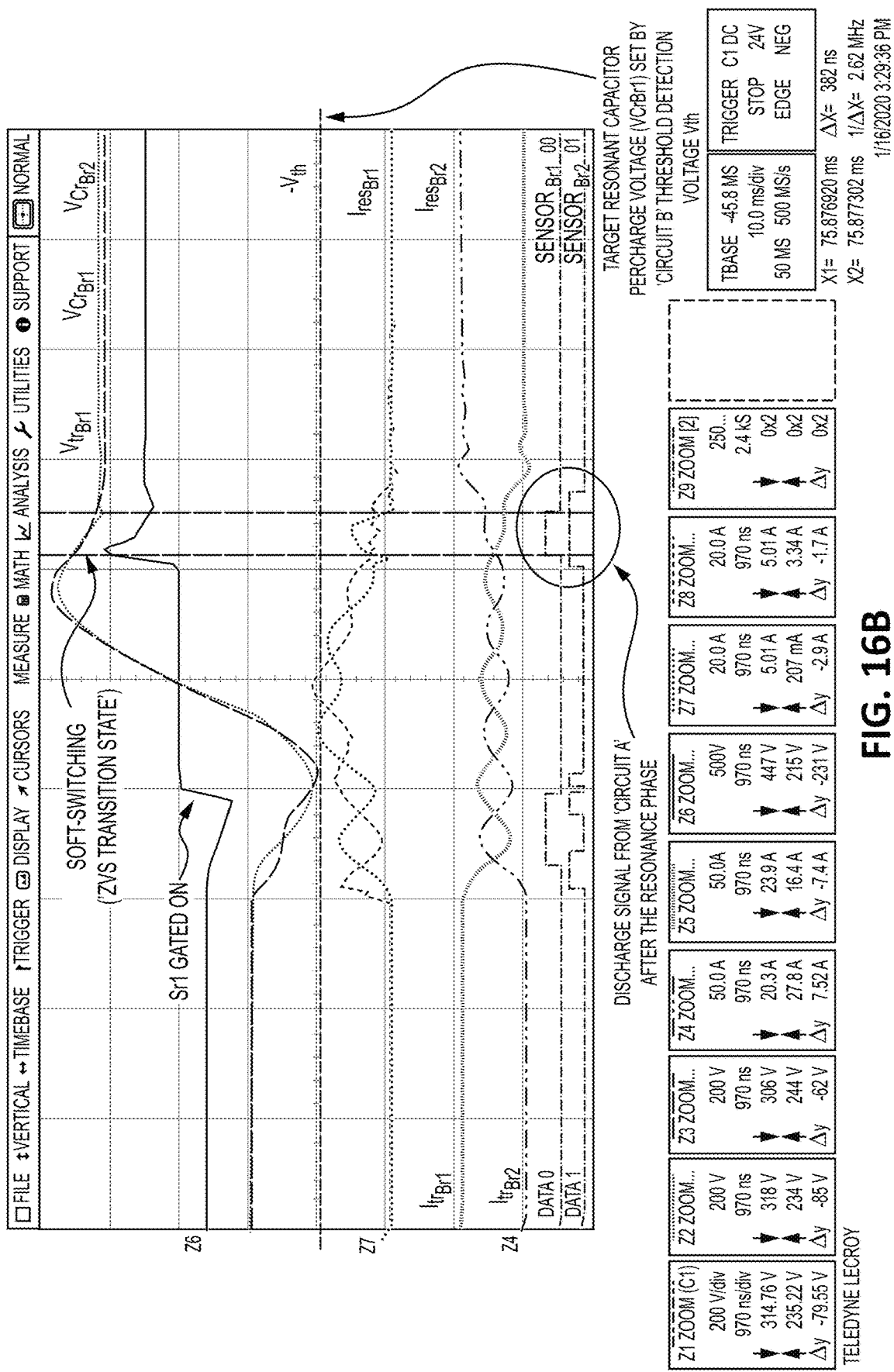

This closed-loop control principle is illustrated experimentally in the three-phase AC/AC S4T implementation of FIG. 1, and shown in FIG. 16. A hard-switching action was observed experimentally in FIG. 16A by the absence of discharge signal from Circuit A after the resonance, and was corrected by increasing the pre-charge threshold voltage in FIG. 16B to measure a satisfactory ZVS transition state duration (400 ns in this example on Sensor Br1) confirming a ZVS turn ON of the incoming vector.

The "closed-loop" control bandwidth of the target resonant capacitor pre-charge voltage can be selected to ensure stability and lead to minimum device voltage stress by adjusting the threshold voltage to the minimum value needed to ensure a proper soft-switching operation. The resonant tank losses can also be minimized in the process. In case of converter transient or fault, this control loop is not required to take actions as the threshold detection can limit the maximum voltage stress under all conditions through direct sensing via Circuit B, yielding a robust control method.

In applications where the Circuit B variant with fixed threshold voltage detection is used, the "closed-loop" control on the threshold voltage may not be possible. The threshold voltage can be set and fixed to the value leading to a soft-switching under all voltage conditions, but this may not be optimal in terms of converter utilization and resonant tank losses. However, the voltage stress and pre-charge time (through delay on $S_r$ gating) can still be directly controlled, at the resonant module level, via detection of the threshold voltage by Circuit B leading to a safe operation of the converter, including under transients and fault conditions, as detailed in FIG. 14.

Once again, this control method, described at the resonant tank circuit and resonant module level, is agnostic to the operational implementation of the S4T or SSCSI converter (or other converters), including the modulation scheme and the number of resonant modules used. These same principles can be extended and applied to all resonant modules, and associated sensing circuits, in the system.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A resonant module for use with a soft-switching current source converter, the resonant module comprising:
   a resonant switch;
   a resonant capacitor connected in parallel with the resonant switch;

a first sensing circuit configured to generate a first sensing signal indicative of when a time derivative of a voltage across the resonant capacitor is negative; and a second sensing circuit configured to generate a second sensing signal indicative of when a voltage across the resonant capacitor is less than or equal to a predetermined threshold value;

wherein a controller of the soft-switching current source converter is configured to turn on at least one switch in at least one bridge of the soft-switching current source converter to transition into a next active switching state if the first sensing signal indicates that the voltage time derivate across the resonant capacitor is negative after a resonance phase of a switching cycle of the soft-switching current source converter.

2. The resonant module of claim 1 further comprising a resonant inductor connected in electrical series with the resonant switch;

wherein the resonant capacitor is connected in parallel with the serially connected resonant switch and resonant capacitor.

3. The resonant module of claim 1 further comprising a control logic circuitry configured to control the resonant switch;

wherein:
the resonant module is configured to transmit one or more signals to a controller of the soft-switching current source converter;
at least one of the one or more signals is selected from the group consisting of the first sensing signal, the second sensing signal, and combinations thereof; and
the control logic circuitry is configured to receive the first and second sensing signals and control the resonant switch, based at least in part, on the first and second sensing signals.

4. The resonant module of claim 1, wherein the predetermined threshold value is a variable value; and wherein at least one of a control logic circuitry or the controller of the soft-switching current source converter is configured to alter the predetermined threshold value based, at least in part, on the first sensing signal.

5. The resonant module of claim 1, wherein the soft-switching current source converter comprises a DC-link;

wherein the resonant module further comprises a leakage management diode connected in series with the resonant capacitor; and wherein the series connection of the leakage management diode and the resonant capacitor is connected in parallel with the DC-link.

6. A resonant module for use with a soft-switching current source converter, the resonant module comprising:
a resonant switch;
a resonant inductor connected in electrical series with the resonant switch;
a resonant capacitor connected in parallel with the serially connected resonant switch and resonant inductor;
a control logic circuitry configured to control the resonant switch;
a first sensing circuit configured to generate a first sensing signal indicative of when a time derivative of a voltage across the resonant capacitor is negative; and
a second sensing circuit configured to generate a second sensing signal indicative of when a voltage across the resonant capacitor is less than or equal to a predetermined threshold value;
wherein the control logic circuitry is further configured to turn on the resonant switch when the second sensing signal indicates that the voltage across the resonant capacitor is less than or equal to the predetermined threshold value to initiate a resonance between the resonant inductor and the resonant capacitor.

7. The resonant module of claim 6, wherein the control logic circuitry is further configured to receive and send sensing signals between one or more other resonant modules of the soft-switching current source converter.

8. A resonant module for use with a soft-switching current source converter, the resonant module comprising:
a resonant switch;
a resonant inductor connected in electrical series with the resonant switch;
a resonant capacitor connected in parallel with the serially connected resonant switch and resonant inductor;
a control logic circuitry configured to control the resonant switch;
a first sensing circuit configured to generate a first sensing signal indicative of when a time derivative of a voltage across the resonant capacitor is negative; and
a second sensing circuit configured to generate a second sensing signal indicative of when a voltage across the resonant capacitor is less than or equal to a predetermined threshold value;
wherein at least one of:
at least one of the control logic circuitry or a controller of the soft-switching current source converter is configured to increase the predetermined threshold value if the first sensing signal indicates the time derivative of the voltage across the resonant capacitor is negative during a zero voltage switching transition state after a resonance phase of a switching cycle of the soft-switching current source converter for a period of time greater than a predetermined time period; or
at least one of the control logic circuitry or a controller of the soft-switching current source converter is configured to decrease the predetermined threshold value if the first sensing signal indicates the time derivative of the voltage across the resonant capacitor is negative during a zero voltage switching transition state after a resonance phase of a switching cycle of the soft-switching current source converter for a period of time less than a predetermined time period.

9. A resonant module comprising:
a resonant switch;
a resonant inductor connected in electrical series with the resonant switch;
a resonant capacitor connected in parallel with the serially connected resonant switch and the resonant inductor;
a first sensing circuit configured to generate a first sensing signal indicative of when a time derivative of a voltage across the resonant capacitor is negative; and
a second sensing circuit configured to generate a second sensing signal indicative of when a voltage across the resonant capacitor is less than or equal to a predetermined threshold value;
wherein:
the first sensing circuit is connected in parallel with the resonant capacitor;
the first sensing circuit comprises a sensing resistor connected in series with an optocoupler;
the serially connected sensing resistor and optocoupler are connected in anti-parallel with a Zener diode.

10. The resonant module of claim 9, wherein the serially connected sensing resistor and optocoupler are further connected in parallel with a bias resistor.

11. The resonant module of claim 10, wherein a sensing capacitor is connected in series with the serially connected sensing resistor and optocoupler; and
wherein the series connection of the sensing capacitor and the serially connected sensing resistor and optocoupler is connected in parallel with the resonant capacitor.

12. The resonant module of claim 9, wherein the optocoupler is configured to generate the first sensing signal.

13. The resonant module of claim 9 further comprising a communication link;
wherein the resonant module is for use with a soft-switching current source converter; and
wherein the communication link is configured to interface with a controller of the soft-switching current source converter.

14. The resonant module of claim 9, wherein the second sensing circuit is connected in parallel with the resonant capacitor; and
wherein the second sensing circuit comprises a reference capacitor, a series optocoupler sensing circuit, a series sensing resistor, and a series diode.

15. The resonant module of claim 14, wherein the second sensing circuit further comprises a discharge circuit connected in parallel with the reference capacitor.

16. The resonant module of claim 15, wherein the discharge circuit comprises a serially connected controllable switch and discharge resistor.

17. The resonant module of claim 16 further comprising an isolated DC/DC converter configured to isolate and power the discharge circuit.

18. The resonant module of claim 15 further comprising a control logic comprising a comparator circuit, a digital isolator, and a frequency-to-voltage conversion circuit, to control a controllable switch of the discharge circuit and control the predetermined threshold value.

19. The resonant module of claim 9, wherein the resonant module is for use with a soft-switching current source converter;
wherein the soft-switching current source converter comprises a DC-link; and
wherein the resonant module is electrically connected in parallel with the DC-link.

20. The resonant module of claim 19 further comprising a leakage management diode connected in series between the resonant module and the DC-link.

21. A resonant module for use with a soft-switching current source converter, the resonant module comprising:
a resonant switch;
a resonant inductor connected in electrical series with the resonant switch;
a resonant capacitor connected in parallel with the serially connected resonant switch and the resonant inductor;
a first sensing circuit configured to generate a first sensing signal indicative of when a time derivative of a voltage across the resonant capacitor is negative; and
a second sensing circuit configured to generate a second sensing signal indicative of when a voltage across the resonant capacitor is less than or equal to a predetermined threshold value;
wherein the second sensing circuit is connected in parallel with the resonant capacitor; and
wherein the second sensing circuit comprises a Zener diode providing a voltage reference, an optocoupler sensing circuit, a series sensing resistor, a series diode, and a capacitive voltage divider.

22. A resonant module for use with a soft-switching current source converter, the resonant module comprising:
a resonant switch;
a resonant inductor connected in electrical series with the resonant switch;
a resonant capacitor connected in parallel with the serially connected resonant switch and the resonant inductor;
a first sensing circuit configured to generate a first sensing signal indicative of when a time derivative of a voltage across the resonant capacitor is negative; and
a second sensing circuit configured to generate a second sensing signal indicative of when a voltage across the resonant capacitor is less than or equal to a predetermined threshold value;
wherein the second sensing circuit is connected in parallel with the resonant capacitor; and
wherein the second sensing circuit comprises a series connection of at least two Zener diodes in opposite orientation, a series sensing resistor, series optocoupler sensing circuit, a capacitive voltage divider, and a resistive voltage divider.

23. A method of controlling a resonant tank of a soft-switching current source converter, the resonant tank comprising a resonant switch, a resonant inductor connected in electrical series with the resonant switch, and a resonant capacitor connected in parallel with the serially connected resonant switch and the resonant inductor, the method comprising:
generating a first sensing signal indicative of when a time derivative of a voltage across the resonant capacitor is negative;
generating a second sensing signal indicative of when a voltage across the resonant capacitor is less than or equal to a predetermined threshold value; and
altering the predetermined threshold value comprising one or both:
increasing the predetermined threshold value if the first sensing signal indicates the time derivative of the voltage across the resonant capacitor is negative during a zero voltage switching transition state after a resonance phase of a switching cycle of the soft-switching current source converter for a period of time greater than a predetermined time period; and/or
decreasing the predetermined threshold value if the first sensing signal indicates the time derivative of the voltage across the resonant capacitor is negative during a zero voltage switching transition state after a resonance phase of a switching cycle of the soft-switching current source converter for a period of time less than a predetermined time period.

24. The method of claim 23 further comprising one or more of:
transmitting the first sensing signal to a controller of the soft-switching current source converter;
transmitting the second sensing signal to a controller of the soft-switching current source converter;
receiving, at a control logic circuitry, the first and second sensing signals;
controlling, with a control logic circuitry, the resonant switch, based at least in part, on the first and second sensing signals received at the control logic circuitry; and/or
turning on the resonant switch, with a control logic circuitry, to initiate a resonance between the resonant inductor and the resonant capacitor when the second sensing signal indicates that the voltage across the resonant capacitor is less than or equal to the predetermined threshold value.

25. The method of claim 23, wherein the predetermined threshold value is a variable value.

26. The method of claim 23 further comprising:
receiving, at a control logic circuitry, the first and second sensing signals; and
controlling, with the control logic circuitry, the resonant switch, based at least in part, on the received first and second sensing signals;
wherein the control logic circuitry comprises a resonant switch gate driver integrated circuit.

27. The method of claim 23, wherein the predetermined threshold value is a fixed value.

28. The method of claim 23, wherein the soft-switching current source converter comprises a DC-link; and
wherein the resonant tank is electrically connected in parallel with the DC-link.

29. The method of claim 28, wherein the soft-switching current source converter further comprises a leakage management diode connected in series with the resonant tank so that the series connection of the resonant tank and the leakage management diode is connected in parallel to the DC-link.

30. The method of claim 23 further comprising altering one or more characteristics of a switching cycle implemented by the soft-switching current source converter to increase an efficiency of the soft-switching current source converter based, at least in part, on the first sensing signal and/or the second sensing signal.

31. The method of claim 23 further comprising altering one or more characteristics of a switching cycle implemented by the soft-switching current source converter;
wherein altering the one or more characteristics of the switching cycle comprises decreasing a time duration of a ZVS transition state of the switching cycle.

32. The method of claim 23 further comprising measuring one or more timing characteristics of a switching cycle implemented by the soft-switching current source converter to, based at least in part on the first sensing signal and/or second sensing signal:
improve accuracy of a modulation strategy;
extend and/or improve linearity of the soft-switching current source converter;
improve a quality of waveforms generated by the soft-switching current source converter; and/or
reduce a harmonic distortion.

33. The method of claim 23 further comprising measuring one or more timing characteristics of a switching cycle implemented by the soft-switching current source converter;
wherein measuring the one or more timing characteristics of the switching cycle comprises measuring a time duration of a ZVS transition state of the switching cycle.

34. A method of controlling a resonant tank of a soft-switching current source converter, the resonant tank comprising a resonant switch, a resonant inductor connected in electrical series with the resonant switch, and a resonant capacitor connected in parallel with the serially connected resonant switch and the resonant inductor, the method comprising:

generating a first sensing signal indicative of when a time derivative of a voltage across the resonant capacitor is negative;
generating a second sensing signal indicative of when a voltage across the resonant capacitor is less than or equal to a predetermined threshold value; and
turning on the resonant switch to initiate a resonance between the resonant inductor and the resonant capacitor when the second sensing signal indicates that the voltage across the resonant capacitor is less than or equal to the predetermined threshold value.

35. The method of claim 34 further comprising at least one of:
altering one or more characteristics of a switching cycle implemented by the soft-switching current source converter to increase an efficiency of the soft-switching current source converter based, at least in part, on the first sensing signal and/or the second sensing signal;
decreasing a time duration of a ZVS transition state of a switching cycle implemented by the soft-switching current source converter using at least in part, the first sensing signal and/or the second sensing signal;
measuring one or more timing characteristics of a switching cycle implemented by the soft-switching current source converter to, based at least in part on the first sensing signal and/or second sensing signal: improve accuracy of a modulation strategy, extend and/or improve linearity of the soft-switching current source converter, improve a quality of waveforms generated by the soft-switching current source converter, and/or reduce a harmonic distortion; or
measuring a time duration of a ZVS transition state of a switching cycle implemented by the soft-switching current source converter.

36. The method of claim 34 further comprising turning on at least one switch of the soft-switching current source converter to transition into a next active switching state if the first sensing signal indicates that a voltage time derivate across the resonant capacitor of a resonant module is negative after a resonance phase of a switching cycle of the soft-switching current source converter.

37. The method of claim 34 further comprising altering the predetermined threshold based, at least in part, on the received first sensing signal;
wherein the predetermined threshold is a variable value; and
wherein altering the predetermined threshold comprises at least one of:
increasing the predetermined threshold if the first sensing signal indicates the time derivative of the voltage across the resonant capacitor is negative during a zero voltage switching transition state immediately after a resonance phase of a switching cycle of the soft-switching current source converter for a period of time greater than a predetermined time period; or
decreasing the predetermined threshold if the first sensing signal indicates the time derivative of the voltage across the resonant capacitor is negative during a zero voltage switching transition state immediately after a resonance phase of a switching cycle of the soft-switching current source converter for a period of time less than the predetermined time period.

* * * * *